US008895658B2

(12) United States Patent
Dandreaux et al.

(10) Patent No.: US 8,895,658 B2
(45) Date of Patent: Nov. 25, 2014

(54) GRAFTED PIGMENT DISPERSING POLYMERIC ADDITIVE AND PAINT EMPLOYING THE SAME WITH IMPROVED HIDING

(71) Applicant: Columbia Insurance Company, Omaha, NE (US)

(72) Inventors: Gary Dandreaux, River Edge, NJ (US); Kevin Scanlon, Lake Hopatcong, NJ (US); Robert J. Sheerin, North Caldwell, NJ (US); Ashley Brewer, Somerset, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 13/717,781

(22) Filed: Dec. 18, 2012

(65) Prior Publication Data

US 2014/0171585 A1    Jun. 19, 2014

(51) Int. Cl.

| C09D 133/06 | (2006.01) |
| C08K 5/09 | (2006.01) |
| C08F 220/18 | (2006.01) |
| C08F 212/08 | (2006.01) |
| C09D 151/00 | (2006.01) |
| C08F 285/00 | (2006.01) |
| C08F 265/02 | (2006.01) |
| C08F 265/04 | (2006.01) |
| C08F 257/02 | (2006.01) |
| C08F 265/06 | (2006.01) |

(52) U.S. Cl.
CPC .......... *C08F 257/02* (2013.01); *C09D 151/003* (2013.01); *C08F 285/00* (2013.01); *C08F 265/02* (2013.01); *C08F 265/04* (2013.01); *C08F 265/06* (2013.01)
USPC ........... 524/560; 524/565; 524/287; 524/293; 524/294; 526/319; 526/326; 526/329.2; 526/329.7

(58) Field of Classification Search
CPC ...... C08F 220/18; C08F 212/08; C08F 20/14; A61L 27/16; C08K 5/09; C08K 5/103; C08K 5/12; C09D 133/06; C08C 19/02
USPC ............ 526/319, 326, 329.2, 329.7; 524/560, 524/565, 287, 293, 294
See application file for complete search history.

(56) References Cited

U.S. PATENT DOCUMENTS

| 3,673,135 | A | 6/1972 | Blake et al. |
| 4,151,143 | A | 4/1979 | Blank et al. |
| 4,426,482 | A | 1/1984 | Kuramoto et al. |
| 4,820,762 | A | 4/1989 | Tsaur |
| 4,916,171 | A | 4/1990 | Brown et al. |
| 5,216,064 | A | 6/1993 | Rivera et al. |
| 5,340,870 | A | 8/1994 | Clinnin et al. |
| 5,369,163 | A * | 11/1994 | Chiou et al. .................. 524/458 |
| 5,385,960 | A | 1/1995 | Emmons et al. |
| 6,020,438 | A | 2/2000 | Lubnin et al. |
| 6,080,802 | A | 6/2000 | Emmons et al. |
| 6,355,734 | B1 | 3/2002 | Cassar et al. |
| 6,548,174 | B2 | 4/2003 | Nakajima et al. |
| 6,673,453 | B2 | 1/2004 | Beavers et al. |
| 7,833,584 | B2 | 11/2010 | Geurts et al. |
| 8,383,718 | B2 | 2/2013 | Grevers et al. |
| 2007/0110981 | A1 | 5/2007 | Killilea et al. |
| 2010/0144937 | A1 | 6/2010 | Fu et al. |
| 2011/0033709 | A1 | 2/2011 | Killilea et al. |
| 2011/0124801 | A1 | 5/2011 | Mitta et al. |
| 2012/0058277 | A1* | 3/2012 | Bohling et al. ............ 427/385.5 |
| 2012/0058278 | A1 | 3/2012 | Bohling et al. |

FOREIGN PATENT DOCUMENTS

| EP | 0587333 A2 | 3/1994 |
| EP | 587333 A2 * | 3/1994 |

OTHER PUBLICATIONS

Lee et al. "Preparation of Small-Sized Carboxylated Latexes by Emulsion Polymerization Using Alkali-Soluble Random Copolymer", J. Appl. Polym. Sci. 69: 543-550, 1998.*
L. Borthakur et al. "Preparation of core-shell latex particles by emulsion co-polymerization of styrene and butyl acrylate, and evaluation of their pigment properties in emulsion paints", Journal of Coatings Technology and Research, Nov. 2010, vol. 7, Issue 6, pp. 765-772.*
International Search Report and Written Opinion issued in connection with the corresponding International Application No. PCT/US2013/063453 on Dec. 9, 2013.
Doug-Youn Lee et al. "Preparation of Small-Sized Carboxylated Latexes by Emulsion Polymerization Using Alkali-Soluble Random Copolymer." Journal of Applied Polymer Science, vol. 69, pp. 543-550. 1998. John Wiley & Sons, Inc.

* cited by examiner

*Primary Examiner* — Michael M Bernshteyn
(74) *Attorney, Agent, or Firm* — The H.T. Than Law Group

(57) ABSTRACT

The present invention relates to a grafted pigment dispersing polymeric additive for opacifying pigments, prepared by polymerizing monomers in the presence of a polymeric pigment dispersant. The polymeric pigment dispersant has low molecular weight, high acid number and is dissolvable in alkali solution. When incorporated into paint compositions, hiding is improved with less opacifying pigments.

21 Claims, 4 Drawing Sheets

GRAFTED PIGMENT DISPERSING POLYMERIC ADDITIVE AND PAINT EMPLOYING THE SAME WITH IMPROVED HIDING

FIELD OF THE INVENTION

This invention generally relates to a grafted polymeric additive for dispersing pigments, such as titanium dioxide, to paints employing the same with improved hiding, and methods for making and using same.

BACKGROUND OF THE INVENTION

Paint comprises a film-forming continuous phase component that may be aqueous or non-aqueous, which contains a polymer as a solute or as a colloidal dispersion. Pigments are particulate compounds which can be dispersed in a resin or polymer binder of paints to provide hiding power and to provide color to paints and coatings. Pigments may also improve the durability and weathering properties, provide opacity and special effects (e.g., flip, sparkle), and modify flow and application properties. Pigments can be dispersed into paints in a dry powder form in a grind, i.e., suspended in an aqueous solution and dispersants, or in a colorant liquid composition. Heavy pigment particles are separated from one another and evenly distributed throughout paint compositions as a colloidal suspension. Otherwise, a variety of defects can occur such as color shift, flooding and floating, settling and loss of gloss. Pigments that have no charges on them and are not coated need surfactants/dispersants for better distribution.

After applying a paint or coating to a substrate and forming a film on the substrate, pigments in the paint or coating prevent light from passing through the film to the layer(s) below on the substrate and back to the eye of an observer. Pigments do this by absorbing and scattering light. The hiding power or opacifying power of a paint can be expressed by the number of square meters covered by 1 liter of paint to produce complete hiding. The hiding power of a pigment can be expressed by the number of square meters covered by a kilogram of pigment, which has been dispersed in a paint and applied so that it will hide the color of any previous layer. Titanium dioxide ($TiO_2$) pigments have excellent hiding power, because their refractive indices are high and because they have the optimum particle size for maximum hiding power. For example, rutile titanium dioxide white has a particle diameter of 200 nm-300 nm. However, titanium dioxide can be transparent when present in the form of large clusters, and its hiding power is reduced significantly when agglomerated, due to reduced light scattering efficiency. On the other hand, good dispersion increases the hiding efficiency of titanium dioxide. In order to maximize the hiding power of a paint composition with titanium dioxide pigments, a dispersing agent should be used to prevent titanium dioxide particles from agglomerating.

Since titanium dioxide is an expensive component, various attempts have been carried out to increase the hiding efficiency of titanium dioxide and reduce the amount of titanium dioxide as a hiding or opacifying pigment in a paint composition. U.S. Pat. No. 5,385,960 to Emmons et al., U.S. Pat. No. 6,080,802 to Emmons et al., US 2012/0058277 to Bohling et al., and US 2012/0058278 to Bohling et al. disclose polymer latex particles that are adsorbed directly to the surface of titanium dioxide particles to achieve optimal spacing between titanium dioxide particles.

There is a continuing need for developing an additive for dispersing pigments, titanium dioxide in particular, to maximize the hiding power of titanium dioxide, thereby reducing the amount of titanium dioxide needed in paints and reducing the cost of manufacturing paints.

SUMMARY OF THE INVENTION

The present invention relates to a grafted polymeric additive for dispersing pigments, especially titanium dioxide, prepared by polymerizing monomers in the presence of a polymeric pigment dispersant, preferably a low molecular weight, and high acid content polymer. The pigment dispersant is soluble in alkali solution. When incorporated into paint, hiding is improved. Therefore, less titanium dioxide is needed for optimum hiding.

A first embodiment of the invention relates to grafted pigment dispersing polymeric additive compositions comprising carrier polymers grafted with a low molecular weight (MW), high acid number pigment dispersant, wherein the pigment dispersant to be grafted is a polymer with a weight average molecular weight of at least about 1000 and preferably from about 1000 to about 20000 and an acid number of at least about 150 and preferably from about 150 to about 250. The grafted pigment dispersing polymer is an additive to a paint composition and comprises at least about 1%, and less than about 50% and preferably less than about 25% of the low MW, high acid pigment dispersant by weight. The pigment dispersant is soluble in alkali solutions.

Another embodiment of the invention relates to a method for preparing grafted pigment dispersing polymeric additives, wherein a low molecular weight, high acid number pigment dispersant is added during the emulsion polymerization, yielding polymeric particles with the pigment dispersant grafted at the surface. The grafted polymeric particles can be single stage polymers, two-stage core-shell polymers or even multistage polymers having a core with multiple shells.

Another embodiment of the invention relates to paint compositions incorporating the grafted pigment dispersing polymeric additive, wherein the paint compositions comprise titanium dioxide and at least one latex binder.

BRIEF DESCRIPTION OF THE DRAWINGS

In the accompanying drawings, which form a part of the specification and are to be read in conjunction therewith and in which like reference numerals are used to indicate like parts in various views.

DETAILED DESCRIPTION OF THE INVENTION

Figure 1A:
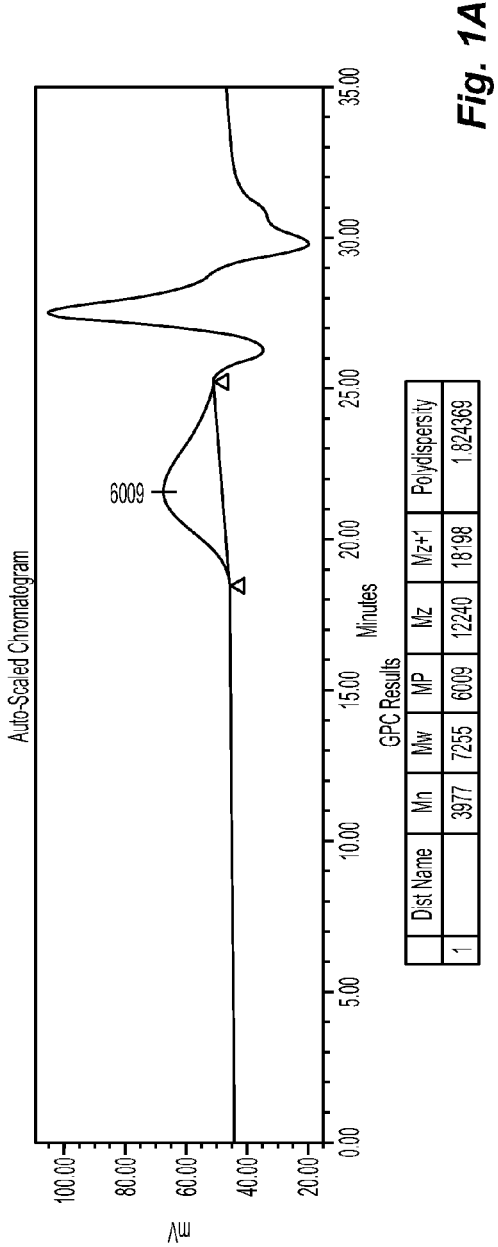
FIG. 1A is gel permeation chromatography (GPC) data of a low MW, high acid number pigment dispersant obtained using a refractive index (RI) detector.
Figure 1B:
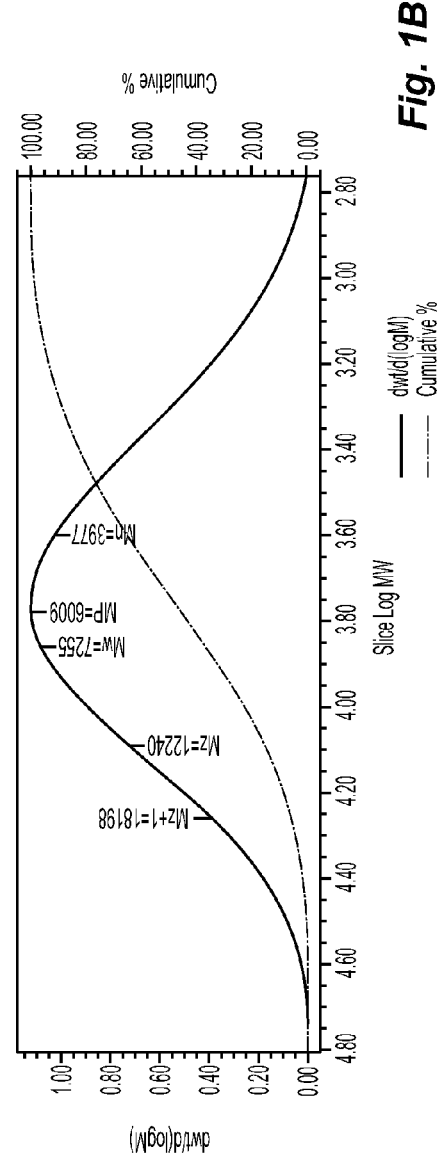
FIG. 1B is an enlarged view of the peak area of FIG. 1A.

Typically, a latex paint is prepared in two steps. In the grind stage, pigments, dispersants and water, along with other additives are added to a vessel and mixed at high speed. During this step, each agglomerate of pigment is broken down into its nascent particle size. Once pigment agglomerates are broken down, they need to be stabilized against reagglomeration. That stability is provided by dispersants, such as the commercially available Tamol™ dispersants which are low molecular weight, acid functional polymers and/or surfactants. These materials are available both base neutralized and un-neutralized. These polyacid dispersants are believed to adsorb onto the pigment particle surface, providing pigment particles which are electrostatically stabilized against agglomeration. In the letdown stage, the grind is mixed with an aqueous latex resin and other additives, such as surfactants, thickeners, defoamers, biocides, etc. to make paint.

The opacifying power of a paint film is a function of the amount and spacing of titanium dioxide in the paint film. To maximize scattering from titanium dioxide particles, they are preferably spaced at least one diameter in distance from each other. As the typical diameter of a particle of titanium dioxide is about 250 nm, that spacing cannot be provided by the low molecular weight polyacid dispersant known in the art.

In one embodiment of the present invention, spacing between titanium dioxide pigment particles is provided by attaching, preferably by grafting, acid functional polymers to the surfaces of carrier polymers, thereby allowing the resulting polymeric particles to adsorb to the titanium oxide pigment surfaces. In the present invention, carrier monomers are polymerized in the presence of a polymeric pigment dispersant to yield polymeric particles with the polymeric pigment dispersant grafted at the surfaces of the resulting polymeric particles.

The present invention generally relates to (i) grafted pigment dispersing polymeric additive compositions comprising emulsion polymers or carrier polymers grafted with a low molecular weight, high acid number polymeric pigment dispersant, (ii) a method for their preparation, wherein a low molecular weight, high acid number pigment dispersant is added during the emulsion polymerization of carrier monomers, (iii) paint compositions incorporating the inventive grafted pigment dispersing polymeric additive, and (iv) a method for reducing titanium dioxide pigment in a paint composition, while maintaining opacity.

In accordance with one aspect of the present invention, low molecular weight, high acid number polymeric pigment dispersants are grafted onto the surface of carrier polymers. Preferably, the pigment dispersants to be grafted are polymers with a molecular weight of about 1000 to about 20,000, preferably from about 5,000 to about 17,000, and more preferably from about 8,000 to about 17,000, and an acid number from about 150 to about 250, preferably from about 200 to about 250 and are soluble in alkali solutions. Commercial examples may include, but are not limited to, Joncryl® available from BASF, Morcryl™ available from DOW, and Tamol™ available from DOW.

The grafted nature of the polymers of the present invention is supported by Gel Permeation Chromatography (GPC) data. The GPC trace of a free or unattached low MW, high acid number pigment dispersant obtained using a refractive index (RI) detector is presented in FIG. 1A and FIG. 1B. In FIGS. 1A-1B, 2A-2B, 3 and 4, the low MW, high acid number polymeric pigment dispersant used is Joncryl® 678 available from BASF, which has a weight average molecular weight of about 8,600 and an acid number of about 215. Properties of other low MW, high acid number polymeric pigment dispersants used in the Examples and experiments are described below.

Figure 2A:
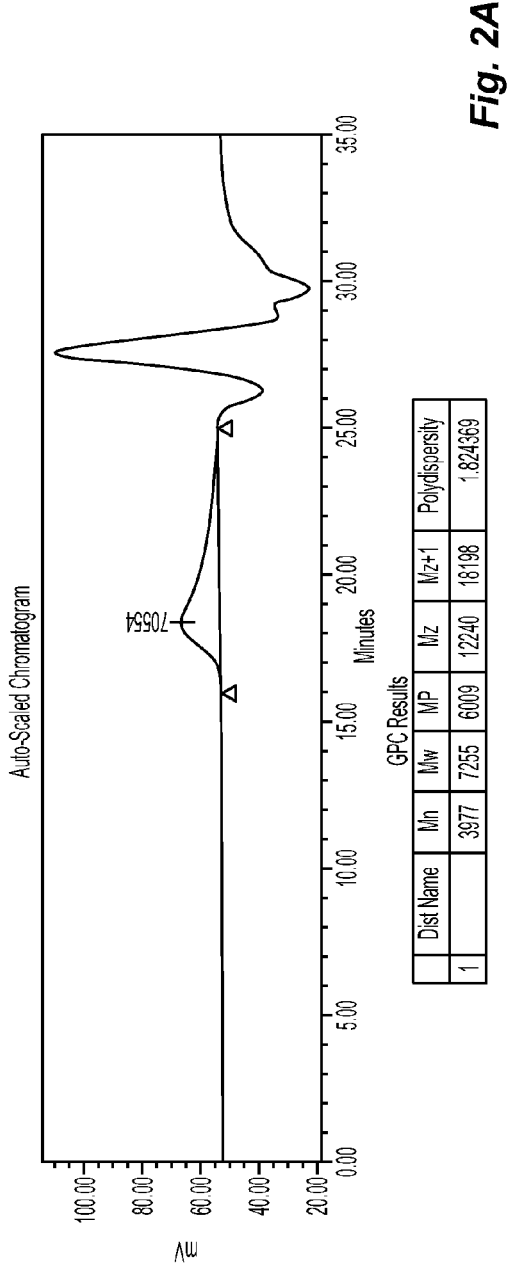
FIG. 2A is GPC data of the polymer prepared using the method of Example 3 below obtained using an RI detector.
Figure 2B:
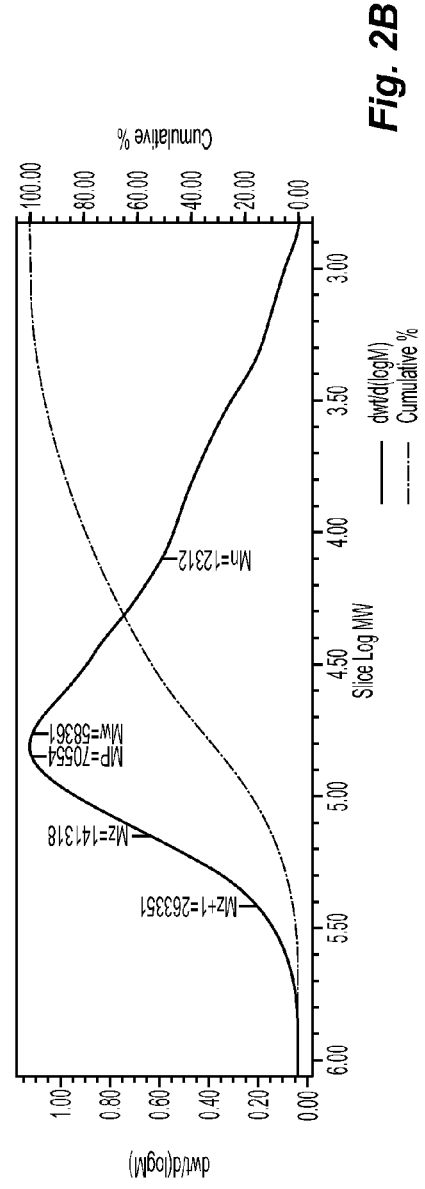
FIG. 2B is an enlarged view of the peak area of FIG. 2A.
Figure 3:
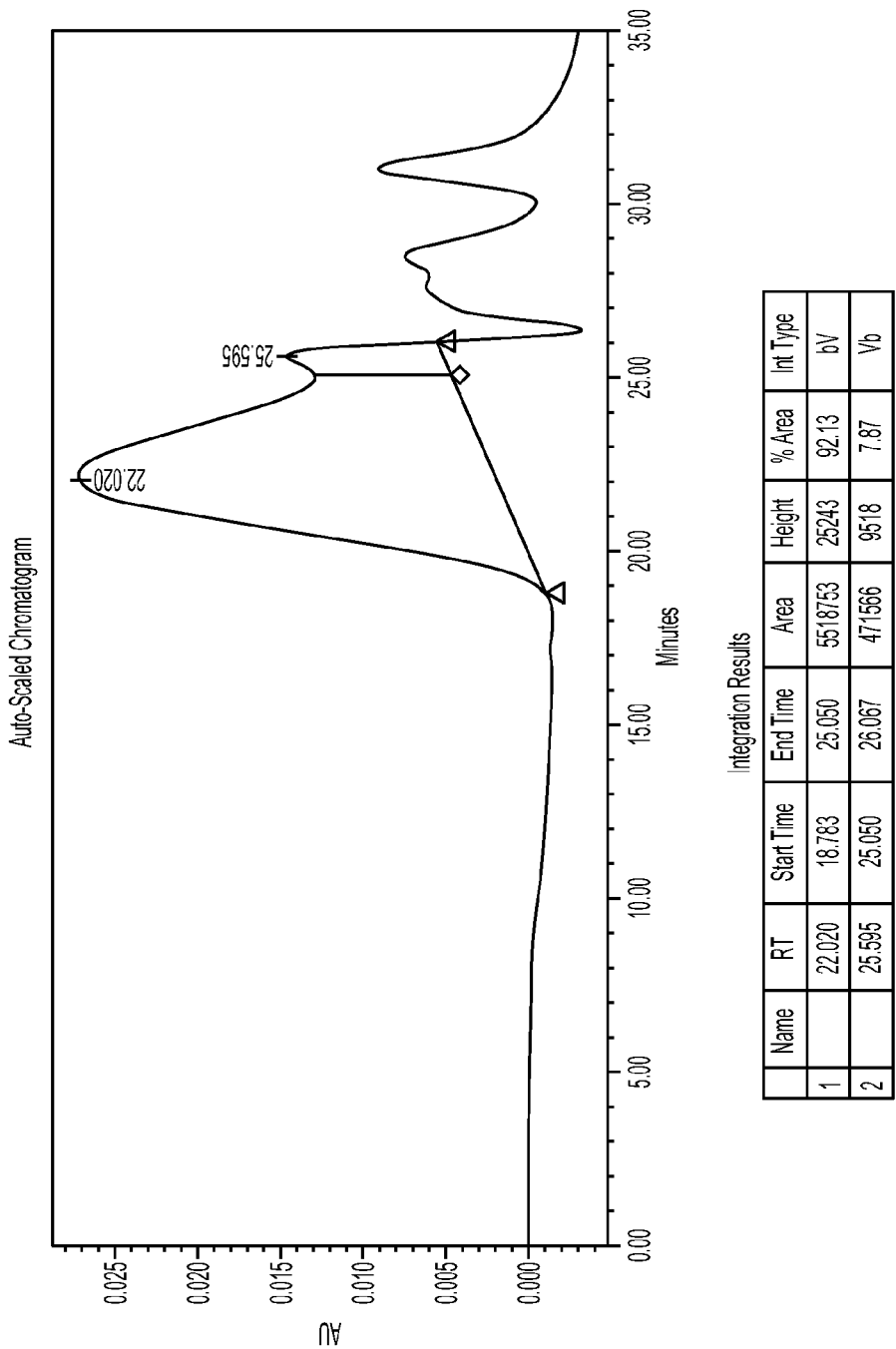
FIG. 3 is GPC data of the low MW, high acid number pigment dispersant used in FIG. 1A obtained using a photodiode array detector (254 nm wavelength)
Figure 4:
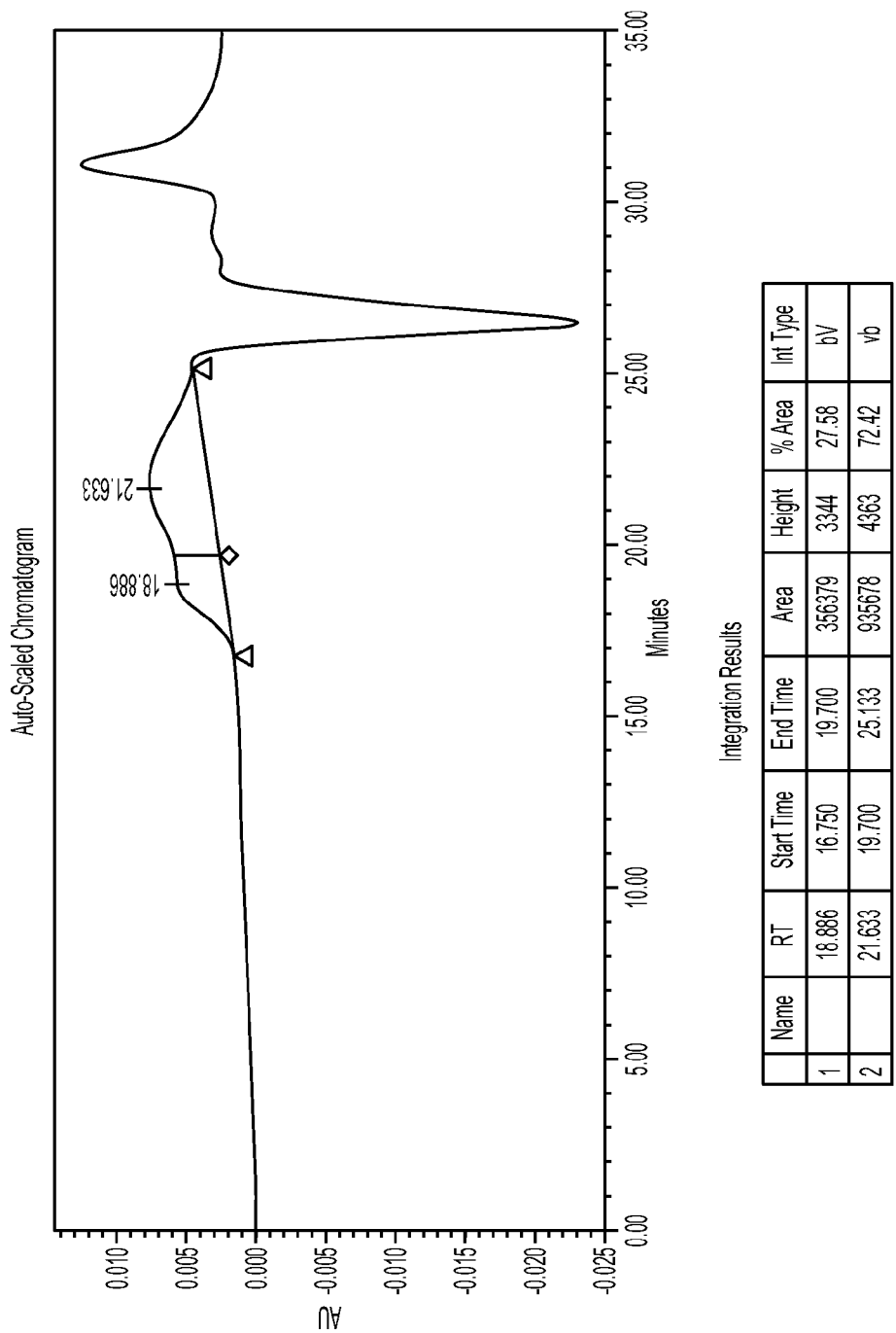
FIG. 4 is GPC data of the polymer prepared using the method of Example 3 below obtained using a photodiode array detector (254 nm wavelength).

The trace in FIG. 1A is uni-modal, with a peak of about 6009 Daltons (based on polystyrene standards) and a peak retention time of about 22 minutes. A grafted polymer with the pigment dispersant discussed above was prepared using the method of Example 3 below, and its GPC trace using an RI detector is shown in FIG. 2A and FIG. 2B. In the trace there is a slight bump in the area where the low MW, high acid number polymeric pigment dispersant would be if it were not grafted; the RI trace suggests that at least some of the low MW, high acid number polymeric pigment dispersant has reacted with methyl methacrylate to form a higher molecular weight polymer that is now embedded within the higher molecular weight region of the trace in FIGS. 2A-2B. Proving grafting is possible by obtaining GPC traces using a photodiode array detector which operates at a wavelength of 254 nm. This detector would generate a response from the low MW, high acid number polymeric pigment dispersant, which contains styrenic moieties, but a polymethylmethacrylate polymer will not generate a response. FIG. 3 is a GPC trace of the free or unattached low MW, high acid number polymeric pigment dispersant obtained using the photodiode array detector which again shows a peak at a retention time of about 22 minutes. FIG. 4 is a trace of the polymer of Example 3 obtained with the photodiode array detector; the low MW, high acid number polymeric pigment dispersant portion of the polymer is what is giving rise to the response in this polymer. There is a peak at about 21.633 minutes which is about the same as that of free low MW, high acid number polymeric pigment dispersant and therefore is due to the unreacted low MW, high acid number polymeric pigment dispersant. However, a second, higher molecular weight peak is also present at 18.886 minutes. This peak is due to the low MW, high acid number polymeric pigment dispersant molecules having molecular weights higher than that of the original low MW, high acid number polymeric pigment dispersant, and the only way this could occur would be through grafting of methyl methacrylate chains with the low MW, high acid number polymeric pigment dispersant chains.

The ratio of the areas below the peaks at 18.886 minutes and 21.633 minutes is about 27%:72%, suggesting the ratio of grafted low MW, high acid number polymeric pigment dispersant to unreacted low MW, high acid number polymeric pigment dispersant is about 27%:72% or about ¼ to ¾ or 1::3.

The grafted pigment dispersing polymer can be added to paint compositions as an additive to improve the hiding power of paint compositions, because the low molecular weight, high acid number polymeric pigment dispersant that is grafted on the carrier polymers can adsorb to the surface of titanium dioxide, allowing better spacing between the titanium dioxide particles. As shown in the examples below, low molecular weight, high acid number polymeric pigment dispersants are added during the emulsion polymerization of monomers that become the carrier polymers. Paints are formulated with the grafted pigment dispersing polymer additives of the invention and their tint strength is tested.

Tint strength is a measure of how well titanium dioxide can add whiteness to a tinted paint. In one tint strength test, two ounces of colorant are added to 126 ounces of paint. Three mil drawdowns are made and allowed to dry overnight. Both an experimental and a control paint are tested. The tint strength of the experimental relative to the standard is determined by measuring the reflectances of the control and experimental drawdowns with a Gretag Macbeth Color Eye 2145, and then determining base tint strength using the software of the Color Eye 2145.

Preferred monomers in the emulsion polymerization process that produces the carrier polymers may include, but are not limited to, methyl methacrylate (MMA) and styrene. Suitable styrene monomers include, but are not limited to, styrene, methylstyrene, chlorostyrene, methoxystyrene and the like.

Grafted MMA resin additives (Examples 14, 17, and 19) show consistent improved tint strength at 85% $TiO_2$ loading compared with the 100% $TiO_2$ loaded control of Example 9, and greatly improved tint strength when compared to the 85% loaded paints of Examples 10 and 11. 100% $TiO_2$ loading means the amount of $TiO_2$ pigments in the standard paint, which is 248 pounds $TiO_2$ per 100 gallons of paint; 85% loaded paint would therefore contain 211 pounds $TiO_2$ per 100 gallons. Contrast ratios of the paints were also determined. For contrast ratios, a 2-mil drawdown of the wet paint is done on a Penopac Chart 5314 (Byk-Gardner). The chart has three regions: a coated black region, a coated white region and an uncoated region. The drawdown is allowed to dry overnight. The following day, the Y reflectance of the paint over the coated black part of the chart and the Y reflectance of the paint over the coated white part of the chart are determined on a Gretag Macbeth Color Eye 2145. Whiter coatings will give rise to higher Y values. The contrast ratio is the ratio of the Y value of the paint over the black region divided by the Y value of the paint over the white region. The contrast ratios of paints 14, 17 and 19 were in the 0.943-0.953 range, which is close to the 0.949-0.958 range observed in the 100% $TiO_2$ loaded control of Example 9. The contrast ratios of paints 14, 17, and 19 also compare favorably to the contrast ratios of 85% $TiO_2$ loaded paints 10 and 11 which are 0.945 and 0.943, respectively. The Y values (over black) or Dry Reflectance over black in Table 1 are in the 88.27-88.77 range for the paints of Examples 14, 17 and 19, which compare favorably to that of the fully $TiO_2$ loaded control of example 9 which is 87.25-88.27. The Y values are much greater than those of the 85% loaded paints of Examples 10, and 11, which are 85.97 and 85.93 respectively. Visually, the dry hides of Examples 14, 17, and 19 are about equal to that of the fully loaded control, and are superior to those of the 85% loaded controls. All of the grafted MMA derivatives are effective at the 85% $TiO_2$ loading level.

Grafted styrene additives show higher or about equal tint strength when the polymeric pigment dispersant concentration is relatively high (Examples 12 and 15) at 85% $TiO_2$ loading versus the 100% $TiO_2$ loaded control and better tint strength than both of the 85% $TiO_2$ loaded controls. The contrast ratios of Examples 12 and 15 are 0.943 and 0.940 respectively, which are close to the 0.949-0.958 range of the fully $TiO_2$ loaded control, and also close to those values for the 85% $TiO_2$ loaded paints 10 and 11. The Y-values over black for examples 12 and 15 are 87.87 and 87.49, respectively, which are in the range of the 100% $TiO_2$ loaded control of Example 9, and much higher than those of the 85% $TiO_2$ loaded paints of Examples 10 and 11. The dry hide of Example 12 is about the same as that of the Example 9 control paint, and better than those of the 85% $TiO_2$ loaded paints. The dry hide of the paint of Example 15 is slightly less than that of the 100% $TiO_2$ containing control, and slightly better than those of the 85% $TiO_2$ loaded paints of Examples 10 and 11. The grafted styrene additive used in the paint of Example 19 has a relatively low dispersant concentration and with respect to hiding is worse than the 100% $TiO_2$ containing control of Example 9 and the 85% $TiO_2$ containing paints of Examples 10 and 11.

Relative to the 100% $TiO_2$ containing control, the tint strength decreases when a blend of MMA and butyl acrylate (BA) is used as the carrier polymer component at 85% $TiO_2$ loading as seen in Examples 13 and 16, with the tint strength of Example 13 being higher than those of the 85% $TiO_2$ containing controls, and the tint strength of Example 16 being about the same as those of the 85% $TiO_2$ containing controls. The contrast ratios of Examples 13 and 16 are close to the values of the 100% and 85% $TiO_2$ containing controls. The Y values of the two paints containing the additive are in the range of those of the 85% $TiO_2$ containing controls, but less than that of the 100% $TiO_2$ containing control. The dry hides of the paints of Example 13 and 16 are slightly weaker than those of the 100% $TiO_2$ containing control. In summary, the MMA/BA blend combination used in these examples is not as effective as using styrene or MMA alone.

Without being bound by theory, it is possible that the MMA/BA combination is leading to relatively soft particles which can deform on film formation, thereby leading to less effective spacing of titanium dioxide particles. Both MMA and styrene lead to harder polymeric particles and more effective spacing of titanium dioxide particles. MMA in particular produces a hard polymer with a high glass transition temperature. Therefore, it is not a typically used alone in the preparation of latex film-forming resins for paint. MMA is more effective for improving tint strength at 85% $TiO_2$ loading than is styrene, which might be related to the former's water solubility. The water solubility of MMA, BA, and styrene are 1.6, 0.14, and 0.03 g/100 mL, respectively. A higher water solubility could lead to greater interaction (grafting) with the water soluble polymeric pigment dispersant, possibly leading to a more effective spacing polymeric additive.

Hard monomers or blends of monomers that yield polymers having minimum film formation temperatures (MFFTs) greater than about 10° C., more preferably greater than about 15° C., and more preferably greater than about 20° C. are used as carrier polymers. The MFFTs are preferably less than about 130° C. and more preferably less than about 100° C.

Another aspect of the invention is directed to the processes of making the grafted pigment dispersing polymeric additive by emulsion polymerization. Preferably, the pigment dispersant polymers are added before initiators to ensure they are grafted onto the carrier polymers. pH adjusters, such as aqueous ammonia are used to render the solution basic, thereby dissolving the pigment dispersant.

Either thermal or redox initiation processes may be used to initiate the polymerization to make the inventive grafted polymeric additive compositions. Conventional free radical initiators may be used such as, for example, hydrogen peroxide, and ammonium, sodium, or potassium persulfate, redox systems such as sodium hydroxymethanesulfinate (reducer) and t-butyl-hydroperoxide (oxidizer), and the like, and combinations thereof.

Examples of chaser solutions useful in the polymerization to make the inventive grafted polymeric additive compositions include, but are not limited to, ammonium persulfate, sodium persulfate, potassium persulfate, redox systems such as sodium hydroxymethanesulfinate (reducer) and t-butyl-hydroperoxide (oxidizer), and the like, and combinations thereof, typically in an aqueous solution. Suitable redox chasers include Bruggolite FF6 M, which is a sodium salt of an organic sulfinic acid derivative and is a reducing agent used in combination with an oxidizing agent to remove residual monomers.

Examples of pH adjustors useful in the preparation of the inventive grafted polymeric additive compositions may include, but are not limited to, ammonium hydroxide, sodium hydroxide, sodium carbonate, sodium bicarbonate, potassium hydroxide, potassium carbonate, potassium bicarbonate, ammonia, amines, aminoalcohols (e.g., 2-amino-2-methyl-1-propanol and/or those compounds sold under the tradename AMP™ 95 by Angus Chemical Co.), and the like, and combinations thereof. Preferred pH adjustors include ammonia, amines and aminoalcohols. In certain cases, compounds that qualify as pH adjustors can be added for purposes other than adjusting pH (e.g., temporary deactivation of otherwise reactive functional groups, emulsion stabilization, or the like), and yet may be still characterized herein as pH adjustors.

Suitable surfactants for use in the preparation of the inventive grafted polymeric additive compositions may include, but are not limited to, nonionic and/or anionic surfactants such as anionic and/or nonionic emulsifiers such as alkali or ammonium alkyl sulfates, alkyl sulfonic acids, fatty acids, oxyethylated alkyl phenols, ammonium nonoxynol-4 sulfate, nonylphenol ethoxylate (10), octylphenol ethoxylate (9-10), sodium dodecylbenzene sulfonate, sodium dodecyl sulfonate, sodium tetradecyl sulfonate, sodium hexadecyl sulfonate, those sold under the tradename TRITON™ (e.g., QS series, CF series, X series, and the like), those sold under the tradename IGEPAL™, those sold under the tradename RHODAPON™, those sold under the tradename RHODAPEX™, those sold under the tradename RHODAFAC™, those sold under the tradename RHODACAL™, and the like, and combinations thereof.

Another aspect of the present invention involves paint compositions comprised of the grafted pigment dispersing polymeric additive of the current invention and a method for reducing titanium dioxide pigment in a paint composition. Titanium dioxide is used as a white pigment to provide hiding power to cover the pre-existing colors or markings on the substrates to be painted. $TiO_2$ is typically dispersed with commercial dispersant, such as Tamol™, in a grind process before mixing with film-forming latex binder and the inventive grafted pigment dispersing polymeric additive in the letdown process. The inventive grafted pigment dispersing polymeric additive can comprise about 1% to about 50% of the paint composition by weight, preferably about 1% to about 25%, more preferably about 1% to about 10%, and more preferably about 5% to about 10%. When the inventive grafted pigment dispersing polymeric additive comprises about 50% of the paint composition, it can perform as the film-forming latex. The ratio of the inventive grafted pigment dispersing polymeric additive v.s. latex binder can be about 1:50 to 50:1. Titanium dioxide loading of paints employing the inventive grafted pigment dispersing polymeric additive can be reduced to 85% or lower of current formulas which don't use the grafted, pigment dispersing, polymeric additive of the invention as shown in Examples 12, 14, 17, and 19. Therefore, the cost of manufacturing paints can be reduced.

As shown in Examples 12, 14, 17 and 19, paint formulations using polymeric pigment dispersant grafted MMA resin and polymeric pigment dispersant grafted styrene resin of the present invention exhibit improved hiding power even with 85% titanium dioxide loading. Grafted MMA resins in Examples 14, 17 and 19 produce the best tint strength as shown in Table 1.

Examples of defoamers useful in the paint compositions according to the invention can include, but are not limited to, polysiloxane-polyether copolymers such as those sold by Tego under the trade name Foamex™, those sold under the trade name BYK™, those sold under the trade name Drewplus™, those sold under the trade name Surfynol™, and the like, and combinations thereof.

Examples of rheology modifiers useful in the paint compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Rohm & Haas under the trade name Acrysol™, such as RM-8W, RM-825, RM-5000, RM-2020 NPR and RM-825, RM-5, TT-935, and Natrasol™, Natrasol Plus™ and Aquaflow™ from Aqualon Division of Hercules Inc., and UCAR Polyphobe™ from Dow.

EXAMPLES

In Examples 1-8, three groups of monomers, i.e., MMA, styrene, and MMA/BA, with minor amounts of MAA serving as the carrier polymers are emulsion polymerized in the presence of polymeric pigment dispersants in various concentrations to graft these dispersants to the carrier polymers. The percentage of polymeric pigment dispersants is the percentage of the total weight of polymeric pigment dispersant and carrier polymer. The percentage is the amount present during the emulsion polymerization of the monomers used to make up the carrier polymer and not all of that percentage ends up grafted. The polymeric pigment dispersants used in the examples are Joncryl® 678 (Examples 1-8 and 20-21), 682 (Example 24) and 690 (Example 25). Their weight average molecular weights are 8600, 1700 and 16500, respectively, and their acid numbers are 215, 238 and 240, respectively. A summary of the properties of the polymeric pigment dispersants and the carrier polymers is presented below.

| Grafted Examples | Polymeric Pigment Dispersants (Acrylic) (MW wt. av.)/acid number/Amount | Carrier Polymers |
|---|---|---|
| 1 | 8600/215/25% | Styrene |
| 2 | 8600/215/25% | MMA/BA ‡ |
| 3 | 8600/215/25% | MMA |
| 4 | 8600/215/14% | Styrene ‡ |
| 5 | 8600/215/14% | MMA/BA ‡ |
| 6 | 8600/215/14% | MMA ‡ |
| 7 | 8600/215/5% | Styrene ‡ |
| 8 | 8600/215/5% | MMA ‡ |
| 20 | 8600/215/25% | Core: styrene Shell: MMA/BA ‡ |
| 21 | 8600/215/25% | Core: MMA Shell: MMA/BA ‡ |
| 24 | 1700/238/5% | MMA ‡ |
| 25 | 16500/240/5% | MMA ‡ |

‡ = including MAA in minor amounts <1%
Un-grafted carrier polymers and pigment dispersants in Examples 28 and 29 are not included.

The resulting grafted polymeric additives are added to paint compositions in Examples 12-19 where the paint compositions have 85% $TiO_2$ loading. Examples 9-11 are comparative control examples where the paint compositions have 100% or 85% $TiO_2$ loading. Visual dry hides, contrast ratios, Y reflectance values and tint strengths for the paints were determined and the results are in Table 1. The visual dry hides are observations of the 2 mil drawdowns used for the contrast ratio measurements. The drawdown of the experimental paint is compared to that of the control containing 100% $TiO_2$, if the paint over the black area of the Leneta card appears to cover the black better than the control it is considered to be "stronger", if it hides less, it is "weaker", if it appears to be the same it is "about same." Note that in the table the abbreviation "sl." stands for "slight." The dry contrast ratios are determined on 2 mil drawdowns using the method described above. The Y value over the black is determined on a 2 mil drawdown as described above. Tint strengths are determined using the method described earlier.

In Examples 20-21, a two stage polymerization process is used to prepare the inventive grafted pigment dispersing polymeric additive, wherein the polymeric particles have a core-shell structure. The hiding properties of the corresponding paint compositions are tested in Examples 22-23 and shown in Table 2.

In Examples 24-25, different molecular weight polymeric dispersants are grafted on to MMA carrier polymers. The hiding properties of the corresponding paint compositions are tested in Examples 26-27 and shown in Table 3. The weight average molecular weights of the grafted pigment dispersing polymeric additives range from about 60,000 Daltons to about 650,000 Daltons.

In Example 28, a carrier polymer is made from MMA resin without any of the low MW, high acid content polymeric pigment dispersant. Example 29 details a preparation of the aqueous solution of low MW, high acid number polymeric pigment dispersant without carrier polymer. Example 30 details the preparation of a paint using the MMA resin of Example 28 as a hiding/dispersing resin. Example 31 is the preparation of a paint using the MMA particles of Example 28 and the low MW, high acid number polymeric pigment dispersant of Example 29. Example 32 is the preparation of paint with only the low MW, high acid number polymeric pigment dispersant of Example 29. The hiding properties of these paint compositions are shown in Table 4.

Example 1

Preparation of grafted pigment dispersing polymeric additive with 25% polymeric pigment dispersant with styrene monomers:

| Reactants | Amount | Condition |
|---|---|---|
| Deionized water | 665.5 g | Heated to 75-80° C. under |
| Aqueous ammonia | 35.1 g | nitrogen and stirring |
| Rhodapon UB (An anionic surfactant, usually a mixture of sodium alkyl sulfates, mainly the lauryl) | 4.5 g | |
| Polypropylene glycol PPG-725 (surfactant, wetting agent, dispersant) | 12.0 g | |
| acrylic polymer, pigment dispersant (8600 MW/215 acid number) | 174.75 g | Stirred until dissolved at 78-80° C. |
| Styrene (monomer) | 50 g | Mixed for 15 min at 78-80° C. |
| Sodium persulfate (radical initiator) in | 2 g | Added at 78° C. and held at 78-80° C. for 15 minutes |
| DI water | 20 g | |
| Styrene (monomer) | 454 g | Fed in over a 2 hr period at 78-80° C. |
| Sodium persulfate (radical initiator) in | 4.2 g | Fed in over a 2.25 hr period (concurrently with Styrene feed) at 78-80° C. 30 min after persulfate feed is finished, reactor is cooled to 60-65° C. |
| Water | 25 g | |
| Reducing agent, e.g., a sodium salt of an organic sulfinic acid derivative in | 1.8 g | At 60-65° C., a reducing agent or chaser solution in water is added, followed by a solution of 0.9 g t-butyl hydroperoxide in water. The reactor is held at 60-65° C. for 15 minutes. |
| DI water | 13.8 g | |
| t-butyl hydroperoxide in water Used to reduce residual monomer (chaser) | 0.9 g 7 g | |
| t-butyl hydroperoxide in water (Continuation of chaser) | 0.9 g 7 g | The t-butyl hydroperoxide solution in water is added at 60-65° C. and the reactor is held at this temperature for 15 minutes. |
| Aqueous ammonia | Until pH 8.7 | After mixture is cooled to room temperature, the pH is adjusted |
| Polycide preservative | 4 g | with ammonia to pH 8.7, and 4 g polycide preservative is added. |

The latex is filtered and has the following properties: solids 47.0%, pH 8.72, viscosity 140 cP, particle size of 97 nm.

Example 2

Preparation of grafted pigment dispersing polymeric additive with 25% polymeric pigment dispersant with MMA/BA/methacrylic acid (MAA) monomers:

| Reactants | Amount | Condition |
|---|---|---|
| Deionized water | 665.5 g | Heated to 75-80° C. under |
| Aqueous ammonia | 35.1 g | nitrogen and stirring |
| Rhodapon UB (An anionic surfactant, usually a mixture of sodium alkyl sulfates, mainly the lauryl) | 4.5 g | |
| Polypropylene glycol PPG-725 (surfactant, wetting agent, dispersant) | 12.0 g | |
| acrylic polymer, pigment dispersant (8600 MW/215 acid number) | 174.75 g | Stirred until dissolved at 78-80° C. |
| Methyl methacrylate/butyl acrylate/methacrylic acid (monomer mixture) | 50 g (52.6/46.8/0.6) | Mixed for 15 min at 78-80° C. |
| Sodium persulfate (radical initiator) in | 2 g | Added at 78° C. and held at 78-80° C. for 15 minutes |
| DI water | 20 g | |
| Methyl methacrylate/butyl acrylate/methacrylic acid (monomer mixture) | 454 g | Fed in over a 2 hr period at 78-80° C. |
| Sodium persulfate (radical initiator) in | 4.2 g | Fed in over a 2.25 hr period (concurrently with the monomer mixture) at 78-80° C. 30 min after persulfate feed is finished, reactor is cooled to 60-65° C. |
| Water | 25 g | |
| Reducing agent in | 1.8 g | At 60-65° C., a reducing agent or chaser solution in water is added, followed by a solution of 0.9 g t-butyl hydroperoxide in water. The reactor is held at 60-65° C. for 15 minutes. |
| DI water | 13.8 g | |
| t-butyl hydroperoxide in water Used to reduce residual monomer (chaser) | 0.9 g 7 g | |
| t-butyl hydroperoxide in water (Continuation of chaser) | 0.9 g 7 g | The t-butyl hydroperoxide solution in water is added at 60-65° C. and the reactor is held at this temperature for 15 minutes. |
| Aqueous ammonia | Until pH 8.4 | After mixture is cooled to room temperature, the pH is adjusted with ammonia to pH 8.4, and 4 g polycide preservative is added. |
| Polycide 428 preservative | 4 g | |

The latex is filtered and has the following properties: solids 45.8%, pH 8.4, viscosity 113 cP, particle size 100 nm.

Example 3

Preparation of grafted pigment dispersing polymeric additive with 25% polymeric pigment dispersant with MMA monomers:

| Reactants | Amount | Condition |
|---|---|---|
| Deionized water | 1277.8 g | Heated to 75-80° C. under nitrogen and stirring |
| Aqueous ammonia | 67.4 g | |
| Rhodapon UB (An anionic surfactant, usually a mixture of sodium alkyl sulfates, mainly the lauryl) | 8.7 g | |
| Polypropylene glycol PPG-725 (surfactant, wetting agent, dispersant) | 23.1 g | |
| acrylic polymer, pigment dispersant (8600 MW/215 acid number) | 335.5 g | Stirred until dissolved at 78-80° C. |
| Methyl methacrylate (monomer) | 96 g | Mixed for 15 min at 78-80° C. |
| Sodium persulfate (radical initiator) in | 3.8 g | Added at 78° C. and held at 78-80° C. for 15 minutes. |
| DI water | 38.4 g | |
| Methyl methacrylate (monomer) | 871.7 g | Fed in over a 2 hr period at 78-80° C. |
| Sodium persulfate (radical initiator) in | 8.07 g | Fed in over a 2.25 hr period (concurrently with the monomer mixture) at 78-80° C. 30 min after persulfate feed is finished, reactor is cooled to 60-65° C. |
| Water | 48 g | |
| Reducing agent in | 5.2 g | At 60-65° C., a reducing agent or chaser solution in water is added, followed by a solution of 2.6 g t-butyl hydroperoxide in water. The reactor is held at 60-65° C. for 15 minutes. |
| DI water | 26.5 g | |
| t-butyl hydroperoxide in water | 2.6 g | |
| Used to reduce residual monomer (chaser) | 13.3 g | |
| t-butyl hydroperoxide in water (Continuation of chaser) | 2.6 g | The t-butyl hydroperoxide solution in water is added at 60-65° C. and the reactor is held at this temperature for 15 minutes. |
| | 13.3 g | |
| Aqueous ammonia | Until pH 8.9 | After mixture is cooled to room temperature, the pH is adjusted with ammonia to pH 8.9, and 7.7 g Polycide preservative is added. |
| Polycide 428 preservative | 7.7 g | |

The latex is filtered and has the following properties: solids 46.6%, pH 8.9, viscosity 134 cP, particle size 125 nm.

Example 4

Preparation of grafted pigment dispersing polymeric additive with 14% polymeric pigment dispersant and styrene monomers:

| Reactants | Amount | Condition |
|---|---|---|
| Pre emulsion: | | |
| Styrene | 967.7 g | Monomers are added to the deionized water and the additives and stirred to form a pre emulsion. |
| Methacrylic acid | 6.3 g | |
| Deionized water | 342.6 g | |
| Aqueous ammonia | 7.24 g | |
| Rhodapon UB (surfactant) | 36.6 g | |
| Rhodafac RS-610 (surfactant) | 12.2 g | |
| Resin: | | |
| Deionized water | 735 g | Heated with stirring to about 75-80° C. under nitrogen. |
| Aqueous ammonia | 50.5 g | |
| Rhodapon UB (surfactant) | 2 g | |
| Sodium bicarbonate | 3 g | |
| Polypropylene glycol PPG-725 (surfactant, wetting agent, dispersant) | 11.6 g | |
| acrylic polymer, pigment dispersant (8600 MW/215 acid number) | 167.5 g | Stirred until dissolved at 78-80° C. |

-continued

| Reactants | Amount | Condition |
|---|---|---|
| Pre emulsion | 134 g | Added to the reaction flask. The flask contents are mixed for 15 minutes at 78-80° |
| Sodium persulfate (radical initiator) in | 1.5 g | Added at 78-80° C. and held at temperature for 15 minutes. |
| DI water | 38.4 g | |
| Pre emulsion | The rest. | Fed in over a 3 hr period |
| Sodium persulfate (radical initiator) in | 2.0 g | Fed in over a 3.25 hr period (concurrently with the pre emulsion feed) 30 min after the persulfate feed is finished, the reactor is cooled to 60-65° C. |
| DI water | 48 g | |
| Reducing agent in | 5.2 g | At 60-65° C., a Reducing agent or chaser solution in water is added, followed by a solution of 2.6 g t-butyl hydroperoxide in water. The reactor is held at 60-65° C. for 15 minutes. |
| DI water | 26.5 g | |
| t-butyl hydroperoxide in water | 2.6 g | |
| Used to reduce residual monomer (chaser) | 13.3 g | |
| t-butyl hydroperoxide in water (Continuation of chaser) | 2.6 g | The t-butyl hydroperoxide solution in water is added at 60-65° C. and the reactor is held at this temperature for 15 minutes. |
| | 13.3 g | |
| Aqueous ammonia | Until pH 9.4 | After the mixture is cooled to room temperature the pH is adjusted with ammonia to pH 9.4, and 7.7 g Polycide preservative is added. |
| Polycide 428 preservative | 7.7 g | |

The latex is filtered and has the following properties: solids 46.5%, pH 9.4, viscosity 33 cP, particle size 132 nm.

Example 5

Preparation of grafted pigment dispersing polymeric additive with 14% polymeric pigment dispersant and MMA/BA monomers:

| Reactants | Amount | Condition |
|---|---|---|
| Pre emulsion: | | |
| Butyl acrylate | 455.7 g | Monomers are added to the deionized water and the additives and stirred to form a pre emulsion. |
| Methyl methacrylate | 512.3 g | |
| Methacrylic acid | 5.9 g | |
| Deionized water | 342.6 g | |
| Aqueous ammonia | 7.24 g | |
| Rhodapon UB (surfactant) | 36.6 g | |
| Rhodafac RS-610 (surfactant) | 12.2 g | |
| Resin: | | |
| Deionized water | 735 g | Heated with stirring to about 75-80° C. under nitrogen. |
| Aqueous ammonia | 50.5 g | |
| Rhodapon UB (surfactant) | 2 g | |
| Sodium bicarbonate | 3 g | |
| Polypropylene glycol PPG-725 (surfactant, wetting agent, dispersant) | 11.6 g | |
| acrylic polymer, pigment dispersant (8600 MW/215 acid number) | 167.5 g | Stirred until dissolved at 78-80° C. |
| Pre emulsion | 134 g | Added to the reaction flask. The flask contents are mixed for 15 minutes at 78-80° C. |
| Sodium persulfate (radical initiator) in | 1.5 g | Added at 78-80° C. and held at temperature for 15 minutes. |
| DI water | 38.4 g | |
| Pre emulsion | The rest. | Fed in over a 3 hr period |
| Sodium persulfate (radical initiator) in | 2.0 g | Fed in over a 3.25 hr period (concurrently with the pre emulsion feed). 30 min after persulfate feed is finished, the reactor is cooled to 60-65° C. |
| DI water | 48 g | |

-continued

| Reactants | Amount | Condition |
|---|---|---|
| Reducing agent in DI water | 5.2 g 26.5 g | At 60-65° C., a reducing agent or chaser solution in water is added, followed by a solution of 2.6 g t-butyl hydroperoxide in water. The reactor is held at 60-65° C. for 15 minutes |
| t-butyl hydroperoxide in water | 2.6 g 13.3 g | |
| Used to reduce residual monomer (chaser) | | |
| t-butyl hydroperoxide in water (Continuation of chaser) | 2.6 g 13.3 g | The t-butyl hydroperoxide solution in water is added at 60-65° C. and the reactor is held at this temperature for 15 minutes. |
| Aqueous ammonia | Until pH 8.6 | After the mixture is cooled to room temperature the pH is adjusted with ammonia to pH 8.6, and 7.7 g Polycide preservative is added. |
| Polycide 428 preservative | 7.7 g | |

The latex is filtered and has the following properties: solids 45.3%, pH 8.6, viscosity 26 cP, particle size 137 nm.

Example 6

Preparation of grafted pigment dispersing polymeric additive with 14% polymeric pigment dispersant and MMA monomer:

| Reactants | Amount | Condition |
|---|---|---|
| Pre emulsion: | | |
| Methyl methacrylate | 967.7 g | Monomers are added to the deionized water and the additives and stirred to form a pre emulsion. |
| Methacrylic acid | 6.3 g | |
| Deionized water | 342.6 g | |
| Aqueous ammonia | 7.24 g | |
| Rhodapon UB (surfactant) | 36.6 g | |
| Rhodafac RS-610 (surfactant) | 12.2 g | |
| Resin: | | |
| Deionized water | 735 g | Heated with stirring to about 75-80° C. under nitrogen. |
| Aqueous ammonia | 50.5 g | |
| Rhodapon UB (surfactant) | 2 g | |
| Sodium bicarbonate | 3 g | |
| Polypropylene glycol PPG-725 (surfactant, wetting agent, dispersant) | 11.6 g | |
| acrylic polymer, pigment dispersant (8600 MW/215 acid number) | 167.5 g | Stirred until dissolved at 78-80° C. |
| Pre emulsion | 134 g | Added to the reaction flask. The flask contents are mixed for 15 minutes at 78-80° C. |
| Sodium persulfate (radical initiator) in DI water | 1.5 g 38.4 g | Added at 78-80° C. and held at temperature for 15 minutes. |
| Pre emulsion | The rest. | Fed in over a 3 hr period |
| Sodium persulfate (radical initiator) in DI water | 2.0 g 48 g | Fed in over a 3.25 hr period (concurrently with the pre emulsion feed). 30 min after persulfate feed, reactor is cooled to 60-65° C. |
| Reducing agent in DI water | 5.2 g 26.5 g | At 60-65° C., a reducing agent or chaser solution in water is added, followed by a solution of 2.6 g t-butyl hydroperoxide in water. The reactor is held at 60-65° C. for 15 minutes |
| t-butyl hydroperoxide in water | 2.6 g 13.3 g | |
| Used to reduce residual monomer (chaser) | | |
| t-butyl hydroperoxide)in water (Continuation of chaser) | 2.6 g 13.3 g | The t-butyl hydroperoxide solution in water is added at 60-65° C. and the reactor is held at this temperature for 15 minutes. |
| Aqueous ammonia | Until pH 9.6 | After the mixture is cooled to room temperature the pH is adjusted with ammonia to pH 9.6, and 7.7 g Polycide preservative is added. |
| Polycide 428 preservative | 7.7 g | |

The latex is filtered and has the following properties: solids 46.8%, pH 9.6, viscosity 266 cP, particle size 177 nm.

Example 7

Preparation of grafted pigment dispersing polymeric additive with 5% polymeric pigment dispersant and styrene monomer:

| Reactants | Amount | Condition |
|---|---|---|
| Pre emulsion: | | |
| Styrene | 1077.7 g | Monomers are added to the deionized water and the additives and stirred to form a pre emulsion. |
| Methacrylic acid | 7.0 g | |
| Deionized water | 361.6 g | |
| Aqueous ammonia | 8.1 g | |
| Rhodapon UB (surfactant) | 40.8 g | |
| Rhodafac RS-610 (surfactant) | 35.9 g | |
| Resin: | | |
| Deionized water | 696 g | Heated with stirring to about 75-80° C. under nitrogen. |
| Aqueous ammonia | 25.0 g | |
| Rhodapon UB (surfactant) | 1.0 g | |
| Sodium bicarbonate | 2 g | |
| Polypropylene glycol PPG-725 (surfactant, wetting agent, dispersant) | 3.8 g | |
| acrylic polymer, pigment dispersant (8600 MW/215 acid number) | 57.0 g | Stirred until dissolved at 78-80° C. |
| Pre emulsion | 77 g | Added to the reaction flask. The flask contents are mixed for 15 minutes at 78-80° C. |
| Sodium persulfate (radical initiator) in DI water | 1.5 g 38.4 g | Added at 78-80° C. and held at temperature for 15 minutes. |
| Pre emulsion | The rest. | Fed in over a 2.75 hr period |
| Sodium persulfate (radical initiator) in DI water | 2.0 g 48 g | Fed in over a 3 hr period (concurrently with the pre emulsion feed). 30 min after persulfate feed, reactor is cooled to 60-65° C. |
| Reducing agent in DI water | 5.2 g 26.5 g | At 60-65° C., a Reducing agent or chaser solution in water is added, followed by a solution of 2.6 g t-butyl hydroperoxide in water. The reactor is held at 60-65° C. for 15 minutes |
| t-butyl hydroperoxide in water | 2.6 g 13.3 g | |
| Used to reduce residual monomer (chaser) | | |
| t-butyl hydroperoxide in water (Continuation of chaser) | 2.6 g 13.3 g | The t-butyl hydroperoxide solution in water is added at 60-65° C. and the reactor is held at this temperature for 15 minutes. |
| Aqueous ammonia | Until pH 9.8 | After the mixture is cooled to room temperature the pH is adjusted with ammonia to pH 9.8, and 7.7 g Polycide preservative is added. |
| Polycide 428 preservative | 7.7 g | |

The latex is filtered and has the following properties: solids 46.8%, pH 9.8, viscosity 18 cP, particle size 99 nm.

Example 8

Preparation of grafted pigment dispersing polymeric additive with 5% polymeric pigment dispersant and MMA monomer:

| Reactants | Amount | Condition |
|---|---|---|
| Pre emulsion: | | |
| Methyl methacrylate | 1077.7 g | Monomers are added to the deionized water and the |
| Methacrylic acid | 7.0 g | |

-continued

| Reactants | Amount | Condition |
|---|---|---|
| Deionized water | 361.6 g | additives and stirred to form |
| Aqueous ammonia | 8.1 g | a pre emulsion. |
| Rhodapon UB (surfactant) | 40.8 g | |
| Rhodafac RS-610 (surfactant) | 35.9 g | |
| Resin: | | |
| Deionized water | 696 g | Heated with stirring to about |
| Aqueous ammonia | 25.0 g | 75-80° C. under nitrogen. |
| Rhodapon UB (surfactant) | 1.0 g | |
| Sodium bicarbonate | 2 g | |
| Polypropylene glycol PPG-725 (surfactant, wetting agent, dispersant) | 3.8 g | |
| acrylic polymer, pigment dispersant (8600 MW/215 acid number) | 57.0 g | Stirred until dissolved at 78-80° C. |
| Pre emulsion | 77 g | Added to the reaction flask. The flask contents are mixed for 15 minutes at 78-80° C. |
| Sodium persulfate (radical initiator) in | 1.5 g | Added at 78-80° C. and held at temperature for 15 minutes. |
| DI water | 38.4 g | |
| Pre emulsion | The rest. | Fed in over a 2.75 hr period |
| Sodium persulfate (radical initiator) in | 2.0 g | Fed in over a 3 hr period (concurrently with the pre emulsion feed). 30 min after the persulfate feed is finished, the reactor is cooled to 60-65° C. |
| DI water | 48 g | |
| Reducing agent in | 5.2 g | At 60-65° C., a Reducing agent or chaser solution in water is added, followed by a solution of 2.6 g t-butyl hydroperoxide in water. The reactor is held at 60-65° C. for 15 minutes |
| DI water | 26.5 g | |
| t-butyl hydroperoxide in water | 2.6 g | |
| Used to reduce residual monomer (chaser) | 13.3 g | |
| t-butyl hydroperoxide in water (Continuation of chaser) | 2.6 g | The t-butyl hydroperoxide solution in water is added at 60-65° C. and the reactor is held at this temperature for 15 minutes. |
| | 13.3 g | |
| Aqueous ammonia | Until pH 9.6 | After the mixture is cooled to room temperature the pH is adjusted with ammonia to pH 9.6, and 7.7 g Polycide preservative is added. |
| Polycide 428 preservative | 7.7 g | |

The latex is filtered and has the following properties: solids 46.9%, pH 9.6, viscosity 714 cP, particle size 126 nm.

Comparative Example 9

Preparation of Standard Paint with 100% $TiO_2$ Loading

It is noted that all values in Examples 1-8, 20-21, 24-25 and 28-29 are in grams and are the actual amounts used in the lab. The data in Examples 9-19, 22-23, 26-27, and 30-32 are also in grams and are the actual amounts used in the lab. The data in the Tables are expressed in terms of "pounds per 100 gallons" which is a common way of expressing formulations in the paint industry. Stormer viscosities were measured on a KU 2 Viscometer (Byk Gardner) and are expressed in units of "KU"; ICI viscosities are measured on Cap 1000+Viscometer and are expressed as "ICI" (actual units are Poise, or "P")

This formulation uses 248 lbs. $TiO_2$ per 100 gallons of paint or 100% $TiO_2$ loading. The $TiO_2$ pigment particles are first dispersed with Tamol and then mixed with the vinyl acrylic latex binder in the paint composition. The current standard paint uses the CR 826/813 $TiO_2$ blend discussed in Example 9. Note again that the amounts here are expressed in grams:

Grind:

| | |
|---|---|
| Propylene Glycol | 19.5 |
| Water | 304.1 |
| Preservatives (Nuosept 95) | 1.5 |
| Hydroxyethyl cellulose (HEC) thickener (Cellosize QP-300) | 6.0 |
| Pigment dispersant (Tamol 731A) | 13.5 |
| Pigment dispersant (Tamol 851) | 3.6 |
| $TiO_2$ pigment (Tronox CR-826) | 223.1 |
| $TiO_2$ pigment (Tronox CR-813) | 148.2 |
| Clay pigment extender (Optiwhite MX) | 67.4 |
| Foam control agent (Drewplus L-475) | 1.4 |

Letdown:

| | |
|---|---|
| Surfactant (Triton X-100) | 6.4 |
| Ester alcohol coalescent (Texanol) | 13.3 |
| Water | 6.0 |
| Vinyl Acrylic latex (53% solids) | 504.5 |
| Rheology modifier (Acrysol RM-5000) | 15.0 |
| Water | 74.8 |
| Modified hydroxyethyl cellulose (Natrosol Plus 330) | 6.0 |
| Ammonia | 1.4 |
| Isoparaffins (Isopar L) | 9.3 |
| Foam control agent (Drewplus L-475) | 8.4 |
| Water | 150.9 |
| Polyethylene glycol/Water float | 9.9 |

The viscosity is adjusted with an additional 1.5 g Natrosol Plus 330 in 20 g of water and 4 g RM-5000 to yield a paint with a viscosity of 92 KU and 1.183 ICI.

Comparative Example 10

Preparation of Standard Paint with 85% $TiO_2$ Loading

This formulation uses 210 lbs. $TiO_2$ per 100 gallons of paint or 85% $TiO_2$ loading.

Grind:

| | |
|---|---|
| Propylene Glycol | 20.0 |
| Water | 312.1 |
| Preservatives (Nuosept 95) | 1.5 |
| Hydroxyethyl cellulose (HEC) thickener (Cellosize QP-300) | 6.1 |
| Pigment dispersant (Tamol 731A) | 13.8 |
| Pigment dispersant (Tamol 851) | 3.7 |
| $TiO_2$ pigment (Tronox CR-826) | 195.2 |
| $TiO_2$ pigment (Tronox CR-813) | 129.4 |
| Clay pigment extender (Optiwhite MX) | 69.2 |
| Foam control agent (Drewplus L-475) | 1.4 |

Letdown:

| | |
|---|---|
| Surfactant (Triton X-100) | 6.6 |
| Ester alcohol coalescent (Texanol) | 13.6 |
| Water | 6.1 |
| Vinyl acrylic latex (53% solids) | 517.9 |
| Rheology modifier (Acrysol RM-5000) | 15.4 |
| Water | 76.8 |
| Modified Hydroxyethylcellulose (Natrosol Plus 330) | 8.0 |
| Ammonia | 1.4 |
| Isoparaffins (Isopar L) | 9.5 |
| Foam control agent (Drewplus L-475) | 8.6 |
| Water | 169.0 |
| Polyethylene glycol/Water float | 10.2 |

The viscosity is adjusted with an additional 0.5 g Natrosol Plus 330 in 20 g of water to yield a paint with a viscosity of 95 KU and 1.358 ICI.

Comparative Example 11

Preparation of Standard Paint at 85% TiO₂ Loading

This formulation uses 210 lbs. TiO₂ per 100 gallons of paint or 85% TiO₂ loading. The preparation is the same as in Example 10, except that 324.6 grams. Ti-Pure R-70 was used instead of 195.2 grams of Tronox CR-826 and grams of Tronox CR-813. A paint with a viscosity of 95 KU and 1.250 ICI was created.

Examples 12-19

Preparation of paints at 85% TiO₂ loading incorporating the inventive grafted pigment dispersing polymeric additives from Examples 1-8, respectively.

The preparation is the same as in Example 11 with the change that 137 g of the grafted pigment dispersing polymeric additive (from Examples 1-8) and 405 g vinyl acrylic latex are used instead of 517.9 g vinyl acrylic latex. (The total amount of solid polymer is the same as in example 11.) Also, 144.5 g water is used in the letdown instead of 169 g in Example 11 to compensate for the extra water provided by the grafted pigment dispersing polymeric additive. In each case the viscosities are adjusted with Natrosol Plus 330 in 20 g of water, and RM-5000 to bring the Ku into a range of 92-96 and ICI of 1.1-1.4.

Paint data is in Table 1 below:

As shown by Tint Strength in Table 1 above, control formulas at 85% TiO₂ loading in Examples 10 and 11 both have decreased tint strength compared with 100% TiO₂ loading in Example 9. MMA based polymeric additives with 85% TiO₂ loading in Examples 14, 17, and 19 lead to improved hiding results at all polymeric pigment dispersant concentrations compared with standard control formula with 100% TiO₂ loading in Example 9 and compared with the 85% loaded Control of Example 11 which uses the same TiO₂. The MMA based polymeric additive with 25% pigment dispersant added to the composition has the best tint strength and remains positive at 14% and 5% concentrations of the polymeric pigment dispersant. This means that the concentration of dispersant added to the composition can be lower than 5% and still have the same tint strength as the 100% TiO₂ loaded control, or that the TiO₂ loading can be lower than 85%. The styrene based polymeric additive with 85% TiO₂ loading in Example 12 also shows improved hiding compared with standard control formula with 100% TiO₂ loading and compared with the 85% loaded Control of Example 11 which uses the same TiO₂. However, when the polymeric pigment dispersant concentration goes down to 14% in Example 15, the tint strength (−0.49) is about the same as that of the 100% TiO₂ loaded control, but still higher than that of the 85% loaded Control of Example 11, and at 5% in Example 18 the tint strength is lower than both the 100% TiO₂ and 85% loaded Controls. Therefore, dispersing polymeric additives made with MMA and styrene monomers grafted with polymeric pigment dispersant improve the hiding power of TiO₂ and require less TiO₂ in the paint formula, thereby reducing the manufacturing cost. The polymeric pigment dispersant concentration can be lower than 5% for MMA and as low as 14% for styrene.

TABLE 1

(data is expressed per 100 gallons of paint)

| Formula Code | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|
| Description | Control Formula | Control at 85% TiO₂ Loading | Control at 85% TiO₂ Loading | Styrene Resin w/25% Joncryl in Letdown using R-706 | MMA/BA polymer w/25% Joncryl in Letdown | MMA polymer w/25% Joncryl in Letdown | Styrene polymer with 14% Joncryl in Letdown | MMA/BA polymer w/14% Joncryl in Letdown | MMA polymer w/14% Joncryl in Letdown | Styrene polymer with 5% Joncryl in Letdown | MMA polymer w/5% Joncryl in Letdown |
| TiO₂ Loading | 100% CR-826/813 248 lbs | 85% CR-826/813 210 lbs | 85% R-706 210 lbs | 85% 706 210 lbs | 85% 706 210 lbs | 85% 706 210 lbs | 85% 706 210 lbs | 85% 706 210 lbs | 85% 706 210 lbs | 85% R-706 210 lbs | 85% 706 210 lbs |
| Resin | 337 lbs vinyl acrylic latex | 337 lbs vinyl acrylic latex | 337 lbs vinyl acrylic latex | 264 lbs vinyl acrylic latex/ 89 lbs dispersing polymer in Example 1 | 264 lbs vinyl acrylic resin/ 89 lbs dispersing polymer in Example 2 | 264 lbs vinyl acrylic latex/ 89 lbs dispersing polymer in Example 3 | 264 lbs vinyl acrylic latex/ 89 lbs dispersing polymer in Example 4 | 264 lbs vinyl acrylic latex/ 89 lbs dispersing polymer in Example 5 | 264 lbs vinyl acrylic latex/ 89 lbs dispersing polymer in Example 6 | 264 lbs vinyl acrylic latex/ 89 lbs dispersing polymer in Example 7 | 264 lbs vinyl acrylic latex/ 89 lbs dispersing polymer in Example 8 |
| Visual Dry Hide | N/A | Weaker | Weaker | About Same | sl. Weaker | About same | sl. Weaker | sl. Weaker | Stronger | Much weaker | About Same |
| Dry Contrast Ratio | 0.949-0.958 | 0.945 | 0.943 | 0.943 | 0.943 | 0.948 | 0.94 | 0.945 | 0.953 | 0.926 | 0.943 |
| Dry Reflectance Over Black | 87.25-88.27 | 85.97 | 85.93 | 87.87 | 85.92 | 88.27 | 87.49 | 86.67 | 88.77 | 84.11 | 88.48 |
| Tint Strength | N/A | −9.80% | −12% | +18% | −3.24 | +6.6 | −0.49 | −11.91 | +4.7 | −17.3 | +2.3 |

MMA/BA polymers in paints loaded with 85% TiO$_2$ do not show improved hiding even with 25% polymeric pigment dispersant. As discussed above, the reason could be that this combination leads to relatively soft particles which can deform on film formation, thereby leading to less effective spacing of TiO$_2$ particles.

The resins can also be prepared in a core/shell or two stage fashion. In this method, one monomer composition is polymerized in the first stage forming a core, and a second monomer composition is polymerized over that forming a shell. Such polymers have a core with a composition different from that of the shell.

Example 20

Preparation of a two stage pigment dispersing polymeric additive with 25% polymeric pigment dispersant and a styrene core and MMA/BA shell with a small amount of MAA in the shell. The styrene core makes up about 80% of the weight of the core-shell carrier polymer.

| Reactants | Amount | Condition |
|---|---|---|
| Deionized water | 1277.8 g | Heated with stirring to about 75-80° C. under nitrogen. |
| Aqueous ammonia | 67.4 g | |
| Rhodapon UB (surfactant) | 8.7 g | |
| Polypropylene glycol PPG-725 (surfactant, wetting agent, dispersant) | 23.1 g | |
| acrylic polymer, pigment dispersant (8600 MW/215 acid number) | 335.5 g | Stirred until dissolved at 75-80° C. |
| Styrene | 96 g | Mixed for 15 min at 75-80° C. |
| Sodium persulfate (radical initiator) in DI water | 3.84 g 38.4 g | Added at 78° C. and held at 78-80° C. for 15 minutes |
| Styrene | 678 g | Fed in over a one hour and 45 min period at 78-80° C. |
| Butyl acrylate (BA) | 90.6 g | After the styrene feed is finished, this mixture is fed in over a 30 min period at 78-80° C. Fed in concurrently with the styrene and BA/MMA/MAA feeds over a two hour and thirty minute period (the persulfate feed continues for 15 min past the end of the monomer blend feed). 30 min after persulfate feed is finished, the reactor is cooled to 60-65° C. |
| Methyl methacrylate (MMA) | 101.8 g | |
| Methacrylic acid (MAA) | 1.2 g | |
| Sodium persulfate (radical initiator) in DI water | 8.0 g 48 g | |
| Reducing agent in DI water | 5.2 g 26.5 g | At 60-65° C., a Reducing agent or chaser solution in water is added, followed by a solution of 2.6 g t-butyl hydroperoxide in 13.2 water. The reactor is held at 60-65° C. for 15 minutes. |
| t-butyl hydroperoxide in water | 2.6 g 13.2 g | |
| Used to reduce residual monomer (chaser) | | |
| t-butyl hydroperoxide in water (Continuation of chaser) | 2.6 g 13.2 g | The t-butyl hydroperoxide solution in water is added at 60-65° C. and the reactor is held at this temperature for 15 minutes. |
| Aqueous ammonia | Until pH 7.9 | After the mixture is cooled to room temperature the pH is adjusted with ammonia to pH 7.9, and 7.7 g Polycide preservative is added. The resulting polymer is filtered. |
| Polycide preservative | 7.7 g | |

The latex is filtered and has the following properties: solids 48.7%, pH 7.9, viscosity 140 cP, particle size 101 nm.

Example 21

Preparation of a two stage grafted pigment dispersing polymeric additive with 25% polymeric pigment dispersant with MMA core and MMA/BA shell with a small amount of MAA in the shell. The MMA core makes up about 80% of the weight of the core-shell carrier polymers.

| Reactants | Amount | Condition |
|---|---|---|
| Deionized water | 1277.8 g | Heated with stirring to about 75-80° C. under nitrogen. |
| Aqueous ammonia | 67.4 g | |
| Rhodapon UB (surfactant) | 8.7 g | |
| Polypropylene glycol PPG-725 (surfactant, wetting agent, dispersant) | 23.1 g | |
| acrylic polymer, pigment dispersant (8600 MW/215 acid number) | 335.5 g | Stirred until dissolved at 75-80° C. |
| Methyl Methacrylate (MMA) | 96 g | Mixed for 15 min at 75-80° C. |
| Sodium persulfate (radical initiator) in DI water | 3.84 g 38.4 g | Added at 78° C. and held at 78-80° C. for 15 minutes. |
| Methyl Methacrylate (MMA) | 678 g | Fed in over a one hour and 45 min period at 78-80° C. |
| Butyl acrylate | 90.6 g | After the MMA feed is finished, this mixture is fed in over a 30 min period at 78-80° C. Fed in concurrently with the MMA and BA/MMA/MAA feeds over a two hour and thirty minute period (the persulfate feed continues for 15 min past the end of the monomer blend feed). 30 min after persulfate feed is finished, the reactor is cooled to 60-65° C. |
| Methyl methacrylate | 101.8 g | |
| Methacrylic acid | 1.2 g | |
| Sodium persulfate (radical initiator) in DI water | 8.0 g 48 g | |
| Reducing agent in DI water | 5.2 g 26.5 g | At 60-65° C., a reducing agent or chaser solution in water is added, followed by a solution of 2.6 g t-butyl hydroperoxide in 13.2 water. The reactor is held at 60-65° C. for 15 minutes. |
| t-butyl hydroperoxide in water | 2.6 g 13.2 g | |
| Used to reduce residual monomer (chaser) | | |
| t-butyl hydroperoxide in water (Continuation of chaser) | 2.6 g 13.2 g | The t-butyl hydroperoxide solution in water is added at 60-65° C. and the reactor is held at this temperature for 15 minutes. |
| Aqueous ammonia | Until pH 7.9 | After the mixture is cooled to room temperature the pH is adjusted with ammonia to pH 7.9, and 7.7 g Polycide preservative is added. The resulting polymer is filtered. |
| Polycide preservative | 7.7 g | |

The latex is filtered and has the following properties: solids 47.5%, pH 7.9, viscosity 89 cP, particle size 101 nm.

Examples 22 and 23

Preparation of paints using the polymeric additives prepared in Examples 20 and 21. Paints are prepared in the same way as those prepared in Examples 12-19 and the results are summarized in Table 2.

TABLE 2

Paints Prepared From the Two Stage Polymeric Additives of Examples 20 and 21

| Formula Code | Example 9 | Example 10 | Example 11 | Example 22 | Example 23 |
|---|---|---|---|---|---|
| Description | Control Formula | Control at 85% TiO$_2$ Loading | Control at 85% TiO$_2$ Loading using R-706 | Styrene Resin First Stage/MMA/BA/MA second stage w/25% Joncryl in Letdown (Example 20) | MMA Resin First Stage/MMA/BA/MA second stage w/25% Joncryl in Letdown (Example 21) |
| TiO$_2$ Loading | 100% CR-826/813 248 lbs | 85% CR-826/813 210 lbs | 85% R-706 210 lbs | 85% R-706 210 lbs | 85% R-706 210 lbs |
| Resin | 337 lbs vinyl acrylic latex | 337 lbs vinyl acrylic latex | 337 lbs vinyl acrylic latex | 264 lbs vinyl acrylic latex/89 lbs Example 20 | 264 lbs vinyl acrylic latex/89 lbs Example 21 |
| Visual Dry Hide | N/A | Weaker | Weaker | About Same | About Same |
| Dry Contrast Ratio | 0.949-0.958 | 0.945 | 0.943 | 0.942 | 0.944 |
| Dry Reflectance | 87.25-88.27 | 85.97 | 85.93 | 87.39 | 87.75 |
| Tint Strength | N/A | −9.80% | −12% | +1.1 | +5.5 |

As shown by Tint Strength in Table 2 above, paint compositions employing the polymeric additives with styrene or MMA core and MMA/BA/MAA shell prepared in a two stage fashion in Examples 20 and 21 have improved hiding even at 85% TiO$_2$ loading.

Without being bound to any particular theory, although the MMA/BA/MAA carrier co-polymer did not show improved tint strength when grafted with the low MW, high acid number polymeric pigment dispersant in Examples 13 and 16, as shown in Table 1, the MMA/BA/MAA in Examples 20-23 when used as a shell with harder cores made from styrene and MMA show improved tint strength at 85% TiO$_2$ loading. This results supports the conclusion above that the inventive grafted pigment dispersant polymeric additive compositions functions better when the additive compositions are harder, i.e., having MFFT of greater than about 10° C., preferably greater than about 15° C., or preferably greater than about 20° C.

Polymeric pigment dispersants having various molecular weights can be used in the preparation of the inventive grafted pigment dispersing polymeric additive, as shown in the Examples 24-27 below.

Example 24

Grafted pigment dispersing polymeric additive using 5% of a polymeric pigment dispersant having a low MW of about 1,700, such as Joncryl® 682 was prepared as follows:

| Reactants | Amount | Condition |
|---|---|---|
| Pre emulsion: | | |
| Methyl methacrylate | 1077.7 g | Monomers are added to the deionized water and the additives. |
| Methacrylic acid | 7.0 g | |
| Deionized water | 361.6 g | |
| Aqueous ammonia | 8.1 g | |
| Rhodacal A246L | 19.0 g | |
| Rhodafac RS-610 | 54.0 g | |
| Resin: | | |
| Deionized water | 696 g | Heated with stirring to about 75-80° C. under nitrogen. |
| Aqueous ammonia | 25.0 g | |
| Rhodacal A246L | 0.75 g | |
| Sodium bicarbonate | 2.0 g | |
| Polypropylene glycol PPG-725 (surfactant, wetting agent, dispersant) | 3.8 g | |
| very low molecular weight acrylic polymer, pigment dispersant (1700 MW/238 acid number) | 57.0 g | Stirred until dissolved at 75-80° C. |
| Pre emulsion | 77 g | Mixed for 15 min at 75-80° C. |
| Sodium persulfate (radical initiator) in | 1.5 g | Added at 78° C. and held at 78-80° C. for 15 minutes |
| DI water | 38.4 g | |
| Pre emulsion | The rest. | Fed in over a 2.75 hr period at 78-80° C. |
| Sodium persulfate (radical initiator) in | 2.0 g | Fed in over a 3 hr period concurrently with the pre emulsion feed (the persulfate feed continues for 15 minutes past the end of the pre emulsion feed). 30 min after the persulfate feed is finished, the reactor is cooled to 60-65° C. |
| DI water | 48 g | |
| Reducing agent in | 5.2 g | At 60-65° C., a Reducing agent or chaser solution in water is added, followed by a solution of 2.6 g t-butyl hydroperoxide in 13.2 water. The reactor is held at 60-65° C. for 15 minutes. |
| DI water | 26.5 g | |
| t-butyl hydroperoxide in water | 2.6 g | |
| | 13.3 g | |
| Used to reduce residual monomer (chaser) | | |
| t-butyl hydroperoxide in water | 2.6 g | The t-butyl hydroperoxide solution in water is added at 60-65° C. and the reactor is held at this temperature for 15 minutes. |
| | 13.3 g | |
| (Continuation of chaser) | | |

-continued

| Reactants | Amount | Condition |
|---|---|---|
| Aqueous ammonia | Until pH 9.3 | After the mixture is cooled to room temperature the pH is adjusted with ammonia to pH 9.3, and 7.7 g Polycide preservative is added. The resulting polymer is filtered. |
| Polycide 428 preservative | 7.7 g | |

The latex was filtered and has the following properties: solids 46.8%, pH 9.3, viscosity 9 cP, particle size 187 nm.

Example 25

Grafted pigment dispersing polymeric additive using 5% of a polymeric pigment dispersant having a higher MW of about 16,500 and an acid number of 240 was prepared in the same manner as Example 24, except that 100 g water is added at the end of the preemulsion feed. Polymer properties are solids 44.8%, pH 9.6, viscosity 5454 cP, particle size 81 nm.

Examples 26 and 27

Paints using the polymeric additives prepared in Examples 24 and 25 were prepared in the same way as those prepared in Examples 12-19 and the results are summarized in Table 3.

TABLE 3

Paints Prepared From the Polymeric Additives Prepared With Different Polymeric Pigment Dispersants in Examples 24 and 25

| Formula Code | Example 9 | Example 10 | Example 11 | Example 26 | Example 27 |
|---|---|---|---|---|---|
| Description | Control Formula | Control at 85% TiO$_2$ Loading | Control at 85% TiO$_2$ Loading using R-706 | MMA polymeric additive with 5% lower MW | MMA polymeric additive with 5% higher MW |
| TiO$_2$ Loading | 100% CR-826/813 248 lbs | 85% CR-826/813 210 lbs | 85% R-706 210 lbs | 85% R-706 210 lbs | 85% R-706 210 lbs |
| Resin | 337 lbs vinyl acrylic latex | 337 lbs vinyl acrylic latex | 337 lbs vinyl acrylic latex | 264 lbs vinyl acrylic latex/89 lbs Example 24 | 264 lbs vinyl acrylic latex/89 lbs Example 25 |
| Visual Dry Hide | N/A | Weaker | Weaker | Weaker | About Same |
| Dry Contrast Ratio | 0.949-0.958 | 0.945 | 0.943 | 0.935 | 0.943 |
| Dry Reflectance | 87.25-88.27 | 85.97 | 85.93 | 86.6 | 88 |
| Tint Strength | N/A | −9.80% | −12% | +1.6 | +1.8 |

As shown by Tint Strength in Table 3 above, paint compositions employing MMA carrier polymers grafted with 1700 MW and 16500 MW pigment dispersant, respectfully, in Example 24 and 25 show improved hiding at 85% TiO$_2$ loading. However, the contrast ratio and dry reflectance values of the Example 26 are much lower than those of Example 27, indicating the lower molecular weight pigment dispersant is perhaps less effective than the higher molecular weight pigment dispersant.

Comparative Example 28

Preparation of a Resin/Carrier Polymer without a Polymeric Pigment Dispersant

A pre emulsion is prepared by adding 1077.7 g methyl methacrylate and 7.0 g methacrylic acid to 361.6 g deionized water, 40.8 g Rhodapon UB, 35.9 g Rhodafac RS-610 and 8.1 g aqueous ammonia. 696 g deionized water, 1.0 g Rhodapon UB, 2 g sodium bicarbonate and 3.8 g polypropylene glycol PPG-725 are heated to about 75-80° C. with stirring under nitrogen. At 79.7° C., 77 g of pre-emulsion is added to the flask and mixed for 15 minutes. A solution of 1.5 g sodium persulfate in 38.4 g DI water is added to the flask at 78° C. Fifteen minutes later the remainder of the pre-emulsion is fed in over a two hour and 45 minute period. A solution of 2.0 g sodium persulfate in 48 g water is fed in concurrently over a three hour period. The persulfate feed continues for fifteen minutes past the end of the pre-emulsion feed. Thirty minutes after the end of the persulfate feed, the reactor is cooled to 60-65° C. 5.2 g of reducing agent in 26.5 g DI water is added, along with 2.6 g t-butyl hydroperoxide in 13.3 g water, to reduce residual monomer (chaser). 15 minutes later another 2.6 g t-butyl hydroperoxide in 13.3 g water is added (continuation of chaser). The mixture is cooled to room temperature where aqueous ammonia is added to bring the pH to 9.1, and 7.7 g Polycide 428 preservative is also added. The latex is filtered and has the following properties: solids 46.5%, pH 9.1, viscosity 41 cP, particle size 143 nm Comparative Example 29

Preparation of a Solution of the Polymeric Pigment Dispersant without a Carrier Polymer A 5 liter flask equipped with a condenser and stirrer is charged with 2500 g deionized water and 172.8 g aqueous ammonia. The flask is heated to a temperature of 75-80° C. 580 g of the low MW, high acid number polymeric pigment dispersant (e.g., Joncryl 678) is added and stirred until dissolved. The solution is cooled to room temperature and discharged from the flask. The solids of the solution make up 18.1% and the pH is 9.8.

Comparative Example 30

Preparation of a Paint at 85% TiO2 Loading with the Methyl Methacrylate Based Resin of Example 28 which Contains No Low MW, High Acid Number Polymeric Pigment Dispersant This comparative example shows the effect on hiding when no low MW, high acid number polymeric pigment dispersant is present. This paint is prepared according to the procedure of Example 11, except that 405.3 g of the vinyl acrylic resin and 137.1 g of the carrier polymer resin of Example 28 are used to replace 517.9 g of the vinyl acrylic resin. Also, 144.5 g water is used in the letdown instead of 169 g in Example 11 to compensate for the extra water provided by the methyl methacrylate resin of Example 28. All values are in grams:

Grind:

| Propylene Glycol | 20.0 |
|---|---|
| Water | 312.1 |
| Preservatives (Nuosept 95) | 1.5 |
| Hydroxyethyl cellulose (HEC) thickener (Cellosize QP-300) | 6.1 |

| | |
|---|---|
| Pigment dispersant (Tamol 731A) | 13.8 |
| Pigment dispersant (Tamol 851) | 3.7 |
| TiO₂ pigment (R-706) | 324.6 |
| Clay pigment extender (Optiwhite MX) | 69.2 |
| Foam control agent (Drewplus L-475) | 1.4 |

Letdown:

| | |
|---|---|
| Surfactant (Triton X-100) | 6.6 |
| Ester alcohol coalescent (Texanol) | 13.6 |
| Water | 6.1 |
| Vinyl acrylic latex | 405.3 |
| MMA (Ex. 28) | 137.1 |
| Rheology modifier (Acrysol RM-5000) | 15.4 |
| Water | 41.2 |
| Modified Hydroxyethylcellulose (Natrosol Plus 330) | 4.6 |
| Water | 7.7 |
| Ammonia | 3.5 |
| Isoparaffins (Isopar L) | 9.5 |
| Foam control agent (Drewplus L-475) | 8.6 |
| Water | 144.5 |
| Polyethylene glycol/Water float | 10.2 |

The viscosity is adjusted with an additional 0.9 g Natrosol Plus 330 in 34 g water, and 12.9 g RM-5000 to yield a paint with a viscosity of 92 KU and 1.075 ICI.

Comparative Example 31

Preparation of a Paint at 85% TiO2 Loading with the Methyl Methacrylate Based Resin of Example 28, and the Low MW, High Acid Number Polymeric Pigment Dispersant Solution of Example 29

This comparative example shows the effect on hiding when the low MW, high acid number pigment dispersant is added to the paint formulation instead of being present during the polymerization of the carrier polymer. In other words, the low MW, high acid number pigment dispersant is not grafted to the carrier polymer. The low MW, high acid number pigment dispersant is present at a level of 14% relative to the total amount of low MW, high acid number pigment dispersant and methyl methacrylate carrier polymer. This paint is prepared according to the procedure of Example 11, except that 405.3 g of the vinyl acrylic resin, 117.9 g of the carrier polymer of Example 28, and 49.3 g of the pigment dispersant solution of Example 29 are used to replace 517.9 g of the vinyl acrylic resin. Also, 114.4 g water is used in the letdown instead of 169 g in Example 11 to compensate for the extra water provided by the resins of Examples 28 and 29. All values are in grams:

Grind:

| | |
|---|---|
| Propylene Glycol | 20.0 |
| Water | 312.1 |
| Preservatives (Nuosept 95) | 1.5 |
| Hydroxyethyl cellulose (HEC) thickener (Cellosize QP-300) | 6.1 |
| Pigment dispersant (Tamol 731A) | 13.8 |
| Pigment dispersant (Tamol 851) | 3.7 |
| TiO₂ pigment (R-706) | 324.6 |
| Clay pigment extender (Optiwhite MX) | 69.2 |
| Foam control agent (Drewplus L-475) | 1.4 |

Letdown:

| | |
|---|---|
| Surfactant (Triton X-100) | 6.6 |
| Ester alcohol coalescent (Texanol) | 13.6 |
| Water | 6.1 |
| Vinyl acrylic latex | 405.3 |
| MMA (Ex. 28) | 117.9 |
| Pigment Dispersant (Ex. 29) | 49.3 |
| Rheology modifier (Acrysol RM-5000) | 15.4 |
| Water | 41.2 |
| Modified Hydroxyethylcellulose (Natrosol Plus 330) | 4.6 |
| Water | 7.7 |
| Ammonia | 3.5 |
| Isoparaffins (Isopar L) | 9.5 |
| Foam control agent (Drewplus L-475) | 8.6 |
| Water | 114.4 |
| Polyethylene glycol/Water float | 10.2 |

The viscosity is adjusted with an additional 5.3 g Natrosol Plus 330 in 34 g water, and 20.2 g RM-5000 to yield a paint with a viscosity of 94 KU and 1.254 ICI.

Comparative Example 32

Preparation of a Paint at 85% TiO2 Loading with the Low MW, High Acid Number Pigment Dispersant Solution of Example 29

This comparative example shows the effect on hiding when only the low MW, high acid number pigment dispersant is added to the paint formulation. This paint is prepared according to the procedure of Example 11, except that 501.5 g of the vinyl acrylic resin, and 49.3 g of the low MW, high acid number pigment dispersant solution of Example 29 are used to replace 517.9 g of acrylic resin. Also, 136.1 g water is used in the letdown instead of 169 g in Example 11 to compensate for the extra water provided by the resin of Example 29. All values are in grams:

Grind:

| | |
|---|---|
| Propylene Glycol | 20.0 |
| Water | 312.1 |
| Preservatives (Nuosept 95) | 1.5 |
| Hydroxyethyl cellulose (HEC) thickener (Cellosize QP-300) | 6.1 |
| Pigment dispersant (Tamol 731A) | 13.8 |
| Pigment dispersant (Tamol 851) | 3.7 |
| TiO₂ pigment (R-706) | 324.6 |
| Clay pigment extender (Optiwhite MX) | 69.2 |
| Foam control agent (Drewplus L-475) | 1.4 |

Letdown:

| | |
|---|---|
| Surfactant (Triton X-100) | 6.6 |
| Ester alcohol coalescent (Texanol) | 13.6 |
| Water | 6.1 |
| Vinyl acrylic latex | 501.5 |
| Pigment Dispersant (Ex. 29) | 49.3 |
| Rheology modifier (Acrysol RM-5000) | 15.4 |
| Water | 41.2 |
| Modified Hydroxyethylcellulose (Natrosol Plus 330) | 4.6 |
| Water | 7.7 |
| Ammonia | 3.5 |
| Isoparaffins (Isopar L) | 9.5 |
| Foam control agent (Drewplus L-475) | 8.6 |
| Water | 136.1 |
| Polyethylene glycol/Water float | 10.2 |

The viscosity is adjusted with an additional 5.8 g Natrosol Plus 330 in 34 g water, and 16.2 g RM-5000 to yield a paint with a viscosity of 91 KU and 1.129 ICI.

Paint data is attached in Table 4. In each comparative Example the tint strengths are not as good as those of the paints employing methyl methacrylate polymers grafted with the acrylic pigment dispersant (8600 MW and 215 acid number). The visual dry hides of the examples are all inferior to the control formula of Example 9, and the contrast ratios are much lower than those of the control formula of Example 9 and the 85% TiO₂ loaded control of Example 11.

TABLE 4

| | | | | Compar. | Compar. | Compar. |
|---|---|---|---|---|---|---|
| Formula Code | Example 9 35121-167 | Example10 35167-169 | Example 11 35121-171 | Example 30 35172-119 | Example 31 35159-63 | Example 32 35172-121 |
| Description | Control Formula | Control at 85% TiO2 Loading | Control at 85% TiO2 Loading using R-706 | MMA Resin alone with pigment dispersant | MMA Resin and pigment dispersant added separately to paint | Pigment dispersant alone added to paint |
| TiO2 Loading | 100% CR-826/813 248 lbs | 85% CR-826/813 210 lbs | 85% R-706 210 lbs | 85% R-706 210 lbs | 85% R-706 210 lbs | 85% R-706 210 lbs |
| Resin | 337 lbs Vinyl acrylic latex | 337 lbs vinyl acrylic latex | 337 lbs vinyl acrylic latex | 264 lbs vinyl acrylic latex/ 89 lbs (Example 28) | 264 lbs vinyl acrylic latex/ 76 lbs (Example 28), 32 lbs (Example 29) | 326 lbs vinyl acrylic latex/ 32 lbs (Example 29) |
| Particle Size (nm) | | | | | | |
| Visual Dry Hide | N/A | Weaker | Weaker | Weaker | Weaker | Weaker |
| Dry Contrast Ratio | 0.949-0.958 | 0.945 | 0.943 | 0.935 | 0.933 | 0.938 |
| Dry Reflectance | 87.25-88.27 | 85.97 | 85.93 | 86.22 | 85.75 | 85.5 |
| Visual Wet Hide | N/A | Weaker | Weaker | Weaker | Weaker | Weaker |
| Wet Contrast Ratio | 0.97 | 0.96 | 0.965 | | | |
| Wet Reflectance | 92.65 | 91.24 | 92 | | | |
| Tint Strength | N/A | −9.80% | −12% | −1.87 | −0.82 | −12.40 |

Table 4 clearly shows that paints with the inventive grafted pigment dispersing polymeric additives possess better performance than paints employing the carrier polymers alone, the polymeric pigment dispersants alone or both.

The particle size of the inventive grafted pigment dispersing polymeric additives ranges from about 75 nm to 188 nm in the examples. Preferably, the inventive grafted pigment dispersing polymeric additives can be from about 50 nm to about 250 nm, preferably from about 60 nm to about 225 nm or more preferably from about 75 nm to about 200 nm.

Another aspect of the invention is directed to methods of making paint compositions while reducing the amount of opacifying pigments to less than 100% loading. This inventive method comprises the steps of:

(i) grafting a pigment dispersing polymer having a molecular weight of about 5,000 to about 20,000 and an acid number of about 150 to 250 to a carrier polymer;
(ii) mixing the grafted pigment dispersing polymer from step (i) to an aqueous composition comprising a latex binder and an opacifying pigment; and
(iii) reducing the opacifying pigment, such as TiO$_2$, to less than 100% loading, e.g., 85% loading.

Another aspect of the present invention is directed to a method of making a grafted pigment dispersing polymeric additive comprising the steps of:

(i) dissolving a polymeric pigment dispersant in a basic solution,
(ii) providing a seed monomer emulsion to the polymeric pigment dispersant solution,
(iii) providing an initiator to the polymeric pigment dispersant solution with heat, and
(iv) feeding monomers to the polymeric pigment dispersant solution,
wherein the polymeric pigment dispersant has a molecular weight of about 5,000 to about 20,000 and an acid number from about 150 to about 250.

The monomers can include methyl methacrylate, methacrylic acid, butyl acrylate or styrene.

Another aspect of the present invention is directed to a method of selecting a monomer to be grafted to a dispersing pigment dispersant having a molecular weight of about 5,000 to about 20,000 and an acid number of about 150 to 250 comprising the steps of (i) grafting said dispersing pigment dispersant to said monomer;
(ii) mixing the grafted dispersing pigment polymer from step (i) to a latex binder and an opacifying pigment at 100% loading in a first aqueous composition;
(iii) mixing the grafted dispersing pigment polymer from step (i) to a latex binder and an opacifying pigment at less than 100% loading in a second aqueous composition, e.g., 85% loading;
(iv) determining a tint strength or a contrast ratio (or another property) of the first and second aqueous compositions after applying on a substrate and dried;
(v) ascertaining the suitability of the monomer by comparing the tint strengths or contrast ratios from step (iv).

While it is apparent that the illustrative embodiments of the invention disclosed herein fulfill the objectives stated above, it is appreciated that numerous modifications and other embodiments may be devised by those skilled in the art.

Feature(s) or element(s) from one embodiment can be used in or with other embodiments. Therefore, it will be understood that the appended claims are intended to cover all such modifications and embodiments, which would come within the spirit and scope of the present invention.

We claim:

1. A grafted pigment dispersing polymeric additive comprising a polymeric pigment dispersant and a polymeric carrier grafted to each other, wherein the polymeric pigment dispersant has a weight average molecular weight of about 1,000 Daltons to about 20,000 Daltons and an acid number from about 150 to about 250 and wherein the polymeric pigment dispersant is soluble in an alkali solution, and wherein the minimum film forming temperature (MFFT) of the polymeric carrier is greater than about 10° C. and less than about 130° C., and wherein the grafted pigment dispersing polymeric additive is capable of adsorbing to an opacifying pigment, and wherein the additive comprises particles having an average particle size in the range of about 75 nm to about 200 nm in diameter.

2. The grafted pigment dispersing polymeric additive of claim 1, wherein the MFFT is greater than about 15° C.

3. The grafted pigment dispersing polymeric additive of claim 1, wherein the MFFT is greater than about 20° C.

4. The grafted pigment dispersing polymeric additive of claim 1, wherein the MFFT is less than about 100° C.

5. A grafted pigment dispersing polymeric additive comprising a polymeric pigment dispersant and a polymeric carrier grafted to each other, wherein the polymeric pigment dispersant has a weight average molecular weight of about 5,000 Daltons to about 20,000 Daltons and an acid number from about 150 to about 250 and wherein the polymeric pigment dispersant is soluble in an alkali solution, and wherein the polymeric carrier comprises at least a styrene or an acrylic group, wherein the grafted pigment dispersing polymeric additive is capable of adsorbing to an opacifying pigment, and wherein the additive comprises particles having an average particle size in the range of about 75 nm to about 200 nm in diameter.

6. The grafted pigment dispersing polymeric additive of claim 5, wherein the acrylic group comprises a methyl methacrylate or a butyl acrylate.

7. The grafted pigment dispersing polymeric additive of claim 5, wherein the polymeric carrier comprises single-stage polymers.

8. The grafted pigment dispersing polymeric additive of claim 5, wherein the polymeric carrier comprises multi-stage polymers.

9. The grafted pigment dispersing polymeric additive of claim 8, wherein the polymeric carrier comprises core-shell polymers.

10. The grafted pigment dispersing polymeric additive of claim 1, wherein the polymeric pigment dispersant comprises at least about 1% of the total weight of the grafted pigment dispersing polymeric additive.

11. The grafted pigment dispersing polymeric additive of claim 1, wherein the polymeric pigment dispersant comprises less than about 50% of the total weight of the grafted pigment dispersing polymeric additive.

12. The grafted pigment dispersing polymeric additive of claim 1, wherein the weight average molecular weight of the polymeric pigment dispersant ranges from about 5,000 Daltons to about 17,000 Daltons.

13. The grafted pigment dispersing polymeric additive of claim 12, wherein the weight average molecular weight of the polymeric pigment dispersant ranges from about 8,000 Daltons to about 17,000 Daltons.

14. The grafted pigment dispersing polymeric additive of claim 1 wherein the acid number of the polymeric pigment dispersant ranges from about 200 to about 250.

15. A paint composition comprising at least a latex binder, the grafted pigment dispersing polymeric additive of claim 1, and an opacifying pigment.

16. The paint composition of claim 15, wherein the opacifying pigment comprises titanium dioxide.

17. The paint composition of claim 15, wherein the weight ratio of the latex binder and the grafted pigment dispersing polymeric additive is 1:50 to 50:1.

18. The grafted pigment dispersing polymeric additive of claim 1, wherein the average particle size is in the range of about 75 nm to 177 nm in diameter.

19. The grafted pigment dispersing polymeric additive of claim 18, wherein the average particle size is in the range of about 75 nm to 137 nm in diameter.

20. The grafted pigment dispersing polymeric additive of claim 5, wherein the average particle size is in the range of about 75 nm to 177 nm in diameter.

21. The grafted pigment dispersing polymeric additive of claim 20, wherein the average particle size is in the range of about 75 nm to 137 nm in diameter.

* * * * *